(12) United States Patent
Horiuchi et al.

(10) Patent No.: US 8,303,013 B2
(45) Date of Patent: Nov. 6, 2012

(54) PICK-UP STYLE UTILITY VEHICLE WITH EXPANDABLE CARGO BED

(75) Inventors: Yuji Horiuchi, Akashi (JP); Yuichi Kawamoto, Akashi (JP); Masahiro Kawahara, Kobe (JP); Teruaki Yamamoto, Lincoln, NE (US); Yoshiya Takehara, Kakogawa (JP); Steave Leach, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 425 days.

(21) Appl. No.: 12/647,897

(22) Filed: Dec. 28, 2009

(65) Prior Publication Data
US 2011/0156433 A1    Jun. 30, 2011

(51) Int. Cl.
*B62D 33/027*    (2006.01)
(52) U.S. Cl. .............. 296/26.1; 296/26.08; 296/26.11; 296/24.43
(58) Field of Classification Search ............... 296/26.08, 296/26.09, 26.11, 190.08, 190.11, 37.6, 183.1, 296/24.4, 26.1
See application file for complete search history.

(56) References Cited

U.S. PATENT DOCUMENTS

| | | | |
|---|---|---|---|
| 6,478,355 B1 * | 11/2002 | Van Eden et al. ............. | 296/37.6 |
| 6,742,834 B1 * | 6/2004 | Merritt et al. ............. | 296/190.11 |
| 6,786,535 B1 * | 9/2004 | Grzegorzewski et al. ......... | 296/190.11 |
| 6,796,600 B1 * | 9/2004 | Ferer et al. ................ | 296/146.1 |
| 6,851,714 B2 * | 2/2005 | Singer ........................ | 280/801.1 |
| 6,905,159 B1 * | 6/2005 | Saito et al. .................. | 296/65.01 |
| 6,959,960 B2 * | 11/2005 | Buccinna et al. ......... | 296/190.11 |
| 6,994,388 B2 * | 2/2006 | Saito et al. .................... | 296/26.1 |
| 7,093,871 B2 * | 8/2006 | Lim et al. .................... | 296/26.08 |
| 7,249,798 B2 * | 7/2007 | Saito et al. .................... | 296/205 |
| 7,566,094 B2 * | 7/2009 | Polewarczyk et al. ... | 296/190.11 |
| 7,578,544 B1 * | 8/2009 | Shimamura et al. ....... | 296/183.2 |
| 7,581,780 B2 * | 9/2009 | Shimamura et al. ....... | 296/183.2 |
| 7,841,639 B2 * | 11/2010 | Tanaka et al. ............. | 296/65.05 |
| RE42,086 E * | 2/2011 | Saito et al. .................... | 296/205 |
| 7,992,911 B2 * | 8/2011 | Naruoka et al. ........... | 296/24.43 |
| 8,016,337 B2 * | 9/2011 | Itou et al. .................... | 296/26.1 |
| 8,075,040 B2 * | 12/2011 | Arnold ............................ | 296/69 |
| 8,096,600 B2 * | 1/2012 | Shinnoki et al. ............... | 296/66 |
| 8,128,144 B2 * | 3/2012 | Mahara et al. ............. | 296/24.43 |
| 8,136,857 B2 * | 3/2012 | Shimizu et al. ............ | 296/26.09 |
| 8,136,859 B2 * | 3/2012 | Morita et al. ............. | 296/26.11 |
| 8,205,924 B2 * | 6/2012 | Masuda et al. ............. | 296/24.43 |
| 8,215,690 B2 * | 7/2012 | Nishiike et al. ............ | 296/24.43 |
| 8,235,443 B2 * | 8/2012 | Kokawa et al. ............ | 296/26.09 |

(Continued)

*Primary Examiner* — Glenn Dayoan
*Assistant Examiner* — Gregory Blankenship
(74) *Attorney, Agent, or Firm* — Wenderoth, Lind & Ponack, LLP

(57) ABSTRACT

A pick-up style utility vehicle with an expandable cargo bed. The vehicle includes a chassis supporting a front seat, a rear seat, a screen formation, and a bottom plate of the cargo bed. The pick-up style utility vehicle is capable of being changed between a normal state in which the rear seat is situated on the bottom plate and an expanded state in which the rear seat is moved from the top of the bottom plate. A screen formation is positioned between the cargo bed in the normal state and the rear seat, and includes two screen formation divisions as a double door, and each of the screen formation divisions is supported rotatably around a vertical shaft by the chassis. In the normal state, the two screen formation divisions close the front of the cargo bed. In the expanded state, the two screen formation divisions open the front of the cargo bed and form side plates in the cargo bed.

7 Claims, 21 Drawing Sheets

U.S. PATENT DOCUMENTS

| | | | |
|---|---|---|---|
| 8,240,737 B2* | 8/2012 | Takaya et al. | 296/65.09 |
| 2005/0184548 A1* | 8/2005 | Saito et al. | 296/26.09 |
| 2005/0184559 A1* | 8/2005 | Saito et al. | 296/190.08 |
| 2006/0131911 A1* | 6/2006 | Lim et al. | 296/26.08 |
| 2009/0256388 A1* | 10/2009 | Tanaka et al. | 296/186.4 |
| 2011/0156433 A1* | 6/2011 | Horiuchi et al. | 296/65.09 |
| 2012/0032465 A1* | 2/2012 | Morita et al. | 296/26.09 |

* cited by examiner

PICK-UP STYLE UTILITY VEHICLE WITH EXPANDABLE CARGO BED

BACKGROUND OF THE INVENTION

1. Field of the Invention

The present invention relates to a pick-up style utility vehicle with an expandable cargo bed, capable of expanding the cargo bed forward, to optimize a cargo space and a passenger's space, according to user demands.

2. Description of the Prior Art

Generally, a pick-up type utility vehicle has a comparatively large cargo bed in the division behind the seat in comparison with the bar steering wheel type utility vehicle belonging to all terrain vehicles. Therefore, the pick-up type utility vehicle is used for practical applications such as movement on golf courses, golf course maintenance, hunting in fields, conveyance of lumber, and the like.

The present applicants have formerly applied the inventions relating to the pick-up style utility vehicles with an expandable cargo bed. These applications have been filed and registered. For example, these applications have issued as U.S. Pat. Nos. 6,905,159, 6,994,388, and 7,249,798.

FIG. 26 shows the pick-up type utility vehicle 901 described in each of the above documents. The pick-up type utility vehicle 901 has a front seat 902 including a driver's seat, a rear seat 903, and a plate part 904 configuring the cargo bed in turn from the front side of the vehicle. The pick-up type utility vehicle 901 can change its state between a normal state and an expanded state. In the normal state, 4 passengers can ride the pick-up type utility vehicle 901. In the expanded state, 2 passengers can ride the pick-up type utility vehicle 901 and the cargo bed is expanded. In the pick-up type utility vehicle 901, a screen shield 905 is arranged between the plate part 904 and the rear seat 903.

FIG. 27 is a side view which shows the pick-up type utility vehicle 901 in the normal state. In the normal state, passengers can sit on both the front seat and the rear seat. The rear seat 903 can change its position between a use state and a shunting state. A passenger can sit on the rear seat 903 in the use state. For example, the rear seat 903 is supported so as to be rotatable around a horizontal shaft, which is arranged at the front end portion of the rear seat 903. FIG. 27 shows the rear seat 903 in the use state and the cargo bed CN in the normal state.

FIG. 28 is a side view which shows the pick-up type utility vehicle 901 in the expanded state. FIG. 28 shows the rear seat 903 in the shunting state and the cargo bed CE in the expanded state. When the rear seat 903 in the use state is toppled on the front side, the rear seat 903 stands and the rear seat 903 is in the shunting state. When the rear seat 903 is in the shunting state, the cargo bed can expand into the space that was occupied by the rear seat 903 in the use state. In other words, in the expanded state, the rear seat 903 is in the shunting state.

A screen shield 905 is arranged at the immediate back of the rear seat 903 to utilize the space in the pick-up type utility vehicle 901. It is necessary not only to move the rear seat 903 into the shunting state but also to advance a position of the screen shield 905 in order to change the cargo bed CN in the normal state into the cargo bed CE in the expanded state. In other words, the position of the screen shield 905 in the expanded state is forward of the position of the screen shield 905 in the normal state. Therefore, when the state is changed between the normal state and the expanded state, it is necessary to move the screen shield 905 by using manpower.

FIG. 29 shows one example of the screen shield 905. For example, the screen shield 905 consists of a steel frame and wire nettings. Therefore, the screen shield 905 is a heavy load. In addition, the screen shield 905 is supported in the chassis by inserting projection portions 905a, 905a of the screen shield 905 in attachment bores arranged at both end portions of the chassis in the right and left direction. In other words, it is necessary to lift the screen shield 905 to move the screen shield 905. Therefore, two persons were necessary to change the position of the screen shield 905, and it was difficult to work only with one person.

SUMMARY OF THE INVENTION

The present inventions have been made in view of the above problems. An object of the present inventions is to provide a pick-up type utility vehicle in which a single worker can easily perform the necessary work to expand the cargo bed and shrink the cargo bed from an expanded state.

The present invention provides a pick-up style utility vehicle with an expandable cargo bed. The pick-up style utility vehicle comprising a chassis supporting a front seat, a rear seat, a screen formation, and a bottomplate of the cargo bed. The pick-up style utility vehicle can be changed between a normal state in which the rear seat is situated on the bottom plate and an expanded state in which the cargo bed is expanded into a free space formed by shunting the rear seat from the top of the bottom plate. The screen formation is between the cargo bed in the normal state and the rear seat, and comprises two screen formation divisions as a double door, and each of the screen formation divisions is supported rotatably around a vertical shaft by the chassis, such that, in the normal state, the two screen formation divisions closing the front of the cargo bed configure a screen in the normal state, and the screen in the normal state separates the rear seat and the cargo body. In the expanded state, the two screen formation divisions which open the front of the cargo bed configure expanded side plates in the cargo bed.

According to the present invention, the passenger does not have to lift heavy loads to change the state of the vehicle between the normal state and the expanded state. Therefore, one worker can easily perform the work necessary to expand the cargo bed and shrink the cargo bed which is expanded.

The present invention preferably adopts the following aspects.

In the first aspect (1) the rear seat comprises: a main seat which is rotatable around a first horizontal shaft of the right and left direction relative to the chassis; and a backrest which is rotatable around a second horizontal shaft relative to the main seat, wherein the rear seat in the expanded state moves forward of the front seat in the normal state.

According to the first aspect (1), the screen in the expanded state can be configured by using the rear seat 3 which the pick-up type utility vehicle has.

In the second aspect (2), the rear seat is configured so that the backrest can be fixed on the main seat which is standing when the backrest is in a standing state where the backrest is standing, wherein in the expanded state, the rear seat in the standing state configures a screen in the expanded state, and the screen in the expanded state separate the rear seat and the cargo bed.

According to the second aspect (2), the screen in the expanded state can be effectively configured by using the rear seat. As the highest position of the rear seat in the standing state is higher than the highest position of the front seat, on this occasion, the rear seat effectively functions as the screen.

In the third aspect (3), each of the screen formation division comprises: a first screen formation section which is supported on the outside of the right and left direction rotatably around a vertical shaft by the chassis in the normal state; and a second screen formation section which is supported on the inside of the right and left direction rotatably around a vertical shaft by the first screen formation section in the normal state, wherein in the expanded state, the two first screen formation sections which open the front of the cargo bed configure the expanded side plates, and the two second screen formation sections which close the front of the cargo bed configure the screen in the expanded state.

According to the third aspect (3), the screen in the normal state and the expanded state can be configured by using the screen formation.

In the fourth aspect, the pick-up style utility vehicle further comprises a cover roll which can roll out a cover along a vertical direction between the front seat and the rear seat. The second screen formation section is arranged at the under portion of the screen formation division, wherein in the normal state, the cover is rolled up, wherein in the expanded state, the two second screen formation sections which close the front of the cargo bed configure the under portion of the screen in the expanded state, and the cover which is rolled out configures the upper portion of the screen in the expanded state.

According to the fourth aspect (4), the screen in the expanded state can be configured more effectively by the two second screen formation section and the cover roll.

In the fifth aspect, the rear seat comprises: a main seat which is rotatable around a first horizontal shaft of the right and left direction relative to the chassis; and a backrest which is rotatable around a second horizontal shaft relative to the main seat, wherein the second screen formation section is arranged at the upper portion of the screen formation division, wherein, in the expanded state, the rear seat configures the under portion of the screen in the expanded state, and the two second screen formation sections which close the front of the cargo bed configure the upper portion of the screen in the expanded state.

According to the fifth aspect (5), the screen in the expanded state can be configured by the two second screen formation section and the rear seat.

In the sixth aspect, the screen formation further comprises a third screen formation division. The third screen formation division is arranged at the upper portion of the screen formation and is supported removably by the two screen formation division, wherein the pick-up style utility vehicle further comprising a supporting part to support the third screen formation division on the chassis, wherein in the expanded state, the rear seat configures the under portion of the screen in the expanded state, and the third screen formation division configures the upper portion of the screen in the expanded state by fitting the third screen formation division in the supporting part.

According to the sixth aspect (6), the screen in the expanded state can be effectively configured by the rear seat and the third screen formation division.

In the seventh aspect (7) the screen formation further comprises a third screen formation division which is arranged at the upper portion of the screen formation, wherein the third screen formation division is fixed on the chassis and comprises, wherein a screen formation supporting flame which rotatably supports the two screen formation division, wherein a panel for the screen which is supported by the screen formation supporting flame.

According to the seventh aspect (7), the screen in the expanded state can be configured by the rear seat and the panel for the screen.

In the eighth aspect (8), the panel for the screen is removably supported by the screen formation supporting flame, wherein the pick-up style utility vehicle further comprising a supporting part to support the panel for the screen on the chassis between the front seat and the rear seat, wherein in the expanded state, the rear seat configures the under portion of the screen in the expanded state, and the panel for the screen configures the upper portion of the screen in the expanded state by fitting the panel for the screen in the supporting part.

According to the eighth aspect (8), the screen in the expanded state can be effectively configured by the rear seat and the panel for the screen.

In the ninth aspect (9), the panel for the screen comprises: an upper stationary panel part which is fixed on the screen formation supporting flame; and a under movable panel part which is supported slidably along the vertical direction relative to the screen formation supporting flame, wherein in the expanded state, the rear seat configures the under portion of the screen in the expanded state, and the upper stationary panel part configures the upper portion of the screen in the expanded state.

According to the ninth aspect (9), by changing a position of the under movable panel part, the capacity of the cargo bed can be enlarged or the screen in the expanded state can be configured.

DETAILED DESCRIPTION OF THE PREFERRED EMBODIMENTS

First Embodiment

Figure 2:
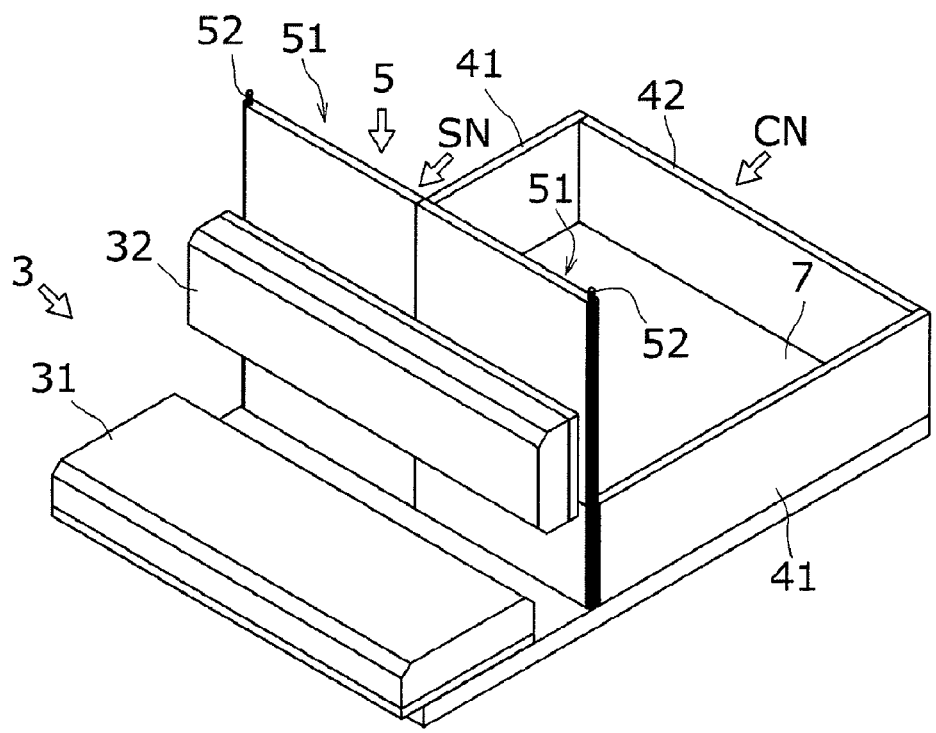
FIG. 2 is a front perspective view which shows a screen formation in a normal state (the first embodiment).
Figure 3:
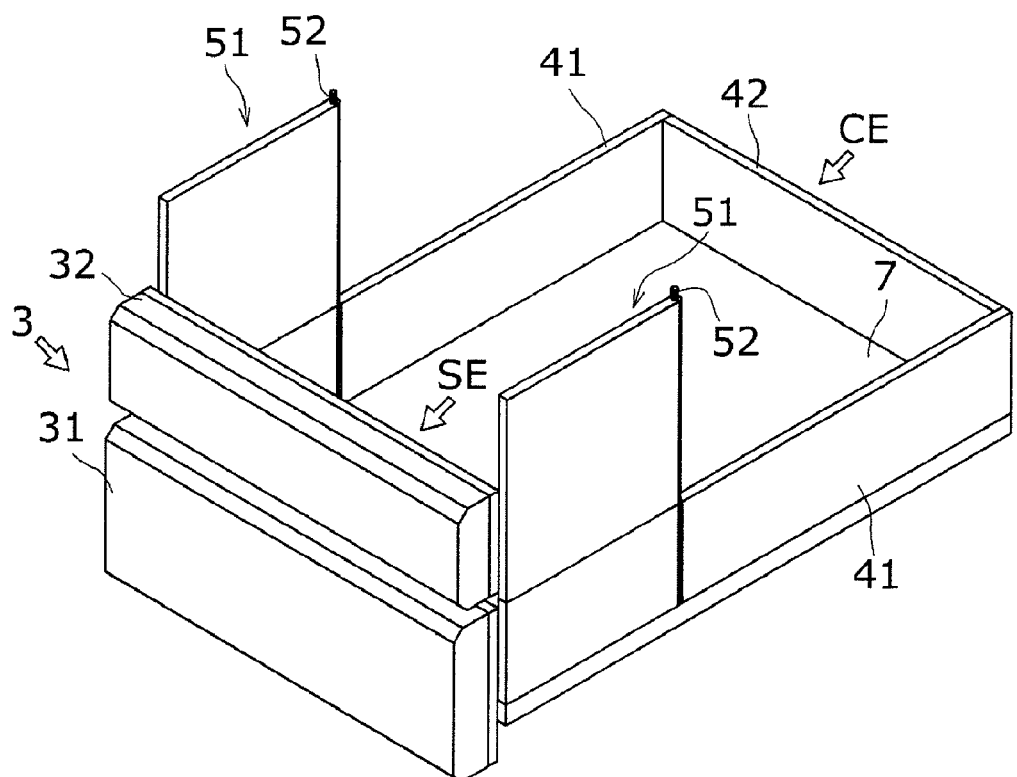
FIG. 3 is a front perspective view which shows a screen formation in an expanded state (the first embodiment).
Figure 4:
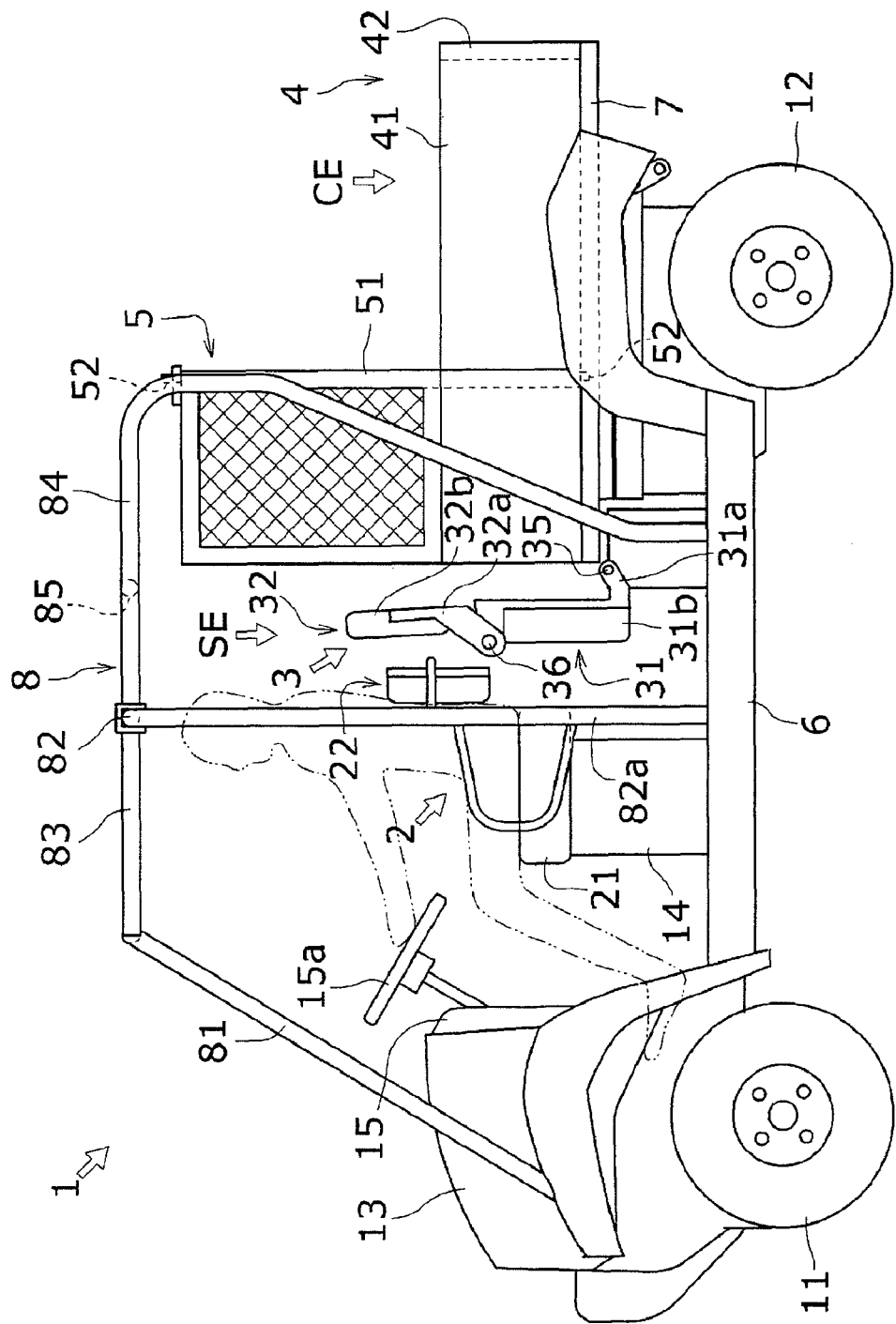
FIG. 4 is a side view which shows the pick-up type utility vehicle in an expanded state (the first embodiment).

The pick-up type utility vehicle 1 can be changed between a normal state (FIG. 1, FIG. 2) and an expanded state (FIG. 3, FIG. 4). In the normal state, 4 passengers can ride the pick-up type utility vehicle 1. In the expanded state, 2 passengers can ride the pick-up type utility vehicle 1 and the cargo bed is expanded. The construction of the pick-up type utility vehicle 1 is explained based on a drawing in detail as follows.

Figure 1:
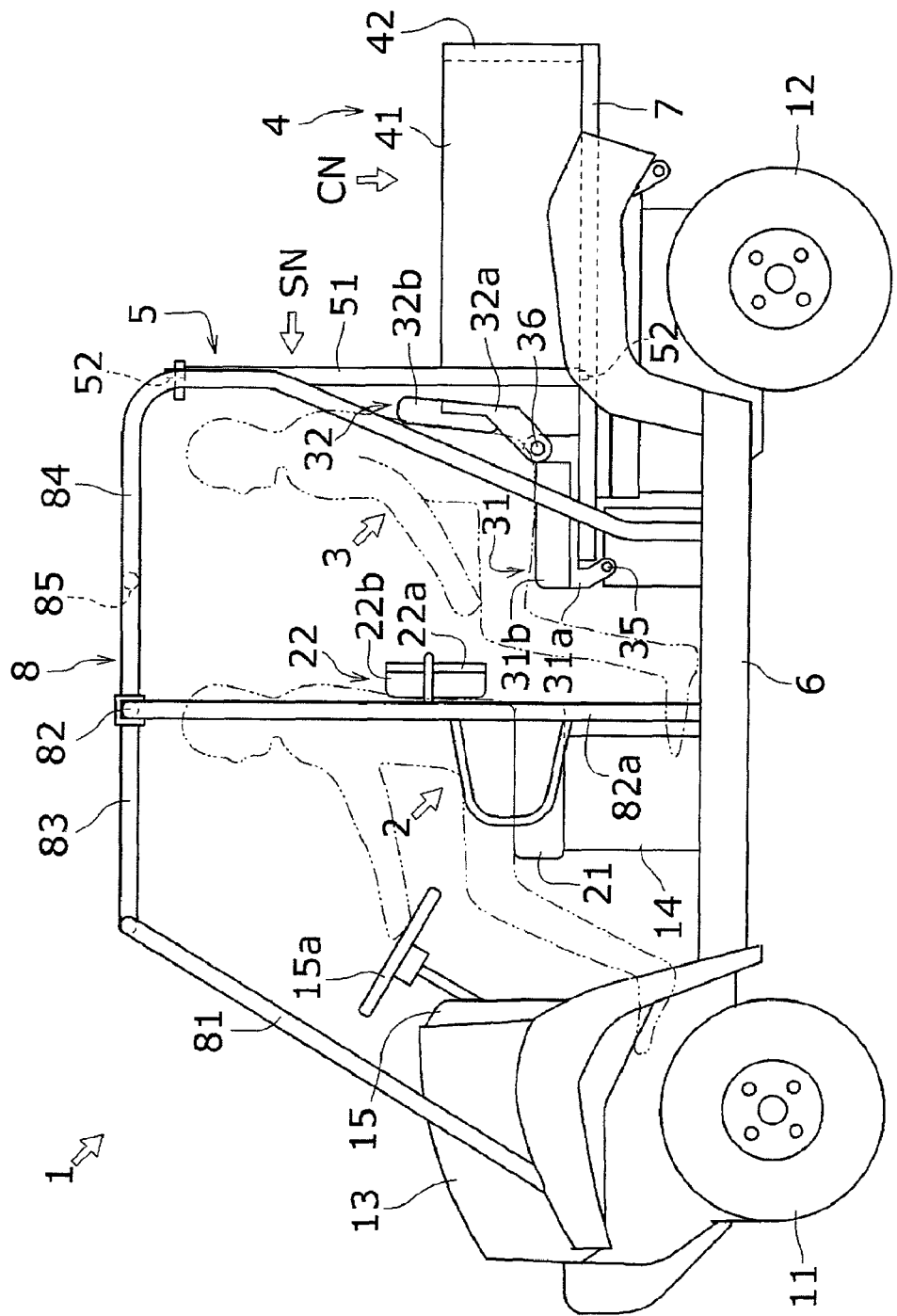
FIG. 1 is a side view which shows a pick-up type utility vehicle in a normal state (the first embodiment).

FIG. 1 is a side view which shows a pick-up type utility vehicle 1 in a normal state. The pick-up type utility vehicle 1 has a chassis 6 which has a pair of right and left front wheels 11, and a pair of right and left rear wheels 12. On the chassis 6, the hood 13, the box 14, and the bottom plate 7 are arranged in turn from the front side. A dashboard 15 (an operating portion) which has a steering wheel 15a is arranged at the rear of the hood 13. A front seat 2 is arranged at the upper side of the box 14. On the bottom plate 7, the rear seat 3, the screen formation 5, and the plate part 4 are arranged in turn from the front side. In addition, a cabin frame 8 is arranged to surround the dashboard 15, the front seat 2, and the rear seat 3. The cabin frame 8 is fixed to the chassis 6. An interior cabin is formed by the chassis 6 and a cabin frame 8.

The cabin frame 8 consists of a first U-shaped member 81, a second U-shaped member 82, two accouplements 83, two L-shaped members 84, and an accouplement 85. The two accouplements 83, the second U-shaped member 82, and the two L-shaped members 84, and the accouplement 85 are arranged in turn behind the first U-shaped member 81. In the front view, the first U-shaped member 81 and the second U-shaped member 82 are U-shaped to open on the downside. The two accouplements 83 connect the first U-shaped member 81 of the front side and the second U-shaped member 82 of the rear side, in right and left. In the side view, the two L-shaped members 84 are inverted L-shaped. The two L-shaped members 84 are arranged to spread from the second U-shaped member 82 to the backward, in right and left. The accouplement 85 connects the two L-shaped members 84.

The front seat 2 and the rear seat 3 are bench type seats which are long in the right and left direction. In the present embodiment, two persons can seat alongside on each of the front seat 2 and the rear seat 3. In addition, a step space for passengers of the front seat 2 is formed between the hood 13 and the box 14. The step space for passengers of the rear seat 3 is formed between the box 14 and the bottom plate 7.

In FIG. 1, the front seat 2 consists of a main seat 21 and a backrest 22. The backrest 22 consists of a backrest backboard 22a and a backrest cushion 22b fixed to the backrest backboard 22a. The main seat 21 is fixed to the box 14. The backrest backboard 22a is fixed to the second U-shaped member 82 to connect both legs 82a of the second U-shaped member 82.

In the rear seat 3, the following constitutions (a) and (a1) are adopted as constitutions concerning the screen.

The constitution (a) is that in FIG. 1, the rear seat 3 has a main seat 31 which is rotatable around a horizontal shaft 35 relative to the chassis, and a backrest 32 which is rotatable around a horizontal shaft 36 relative to the main seat 31.

The main seat 31 has a seat backboard 31a and a seat cushion 31b which is fixed to the seat backboard 31a. The backrest 32 has a backrest backboard 32a and a backrest cushion 32b which is fixed to the backrest backboard 32a. In the positional relation of FIG. 1, a front end portion of the seat backboard 31a is supported on the bottom plate 7 rotatably around the horizontal shaft 35. Similarly, in the positional relation of FIG. 1, the bottom head of the backrest backboard 32a is supported on the seat backboard 31a rotatably around the horizontal shaft 36. The horizontal shafts 35, 36 are shafts extending in the right and left direction.

The state of the rear seat 3 can be changed between the use state and the shunting state. The use state is a state where the main seat 31 is on the bottom plate 7. When the rear seat is in the use state, the passenger can ride on the rear seat 3. The shunting state is a state where the main seat 31 is standing forward by making the main seat 31 rotate around the horizontal shaft 35.

Figure 8:
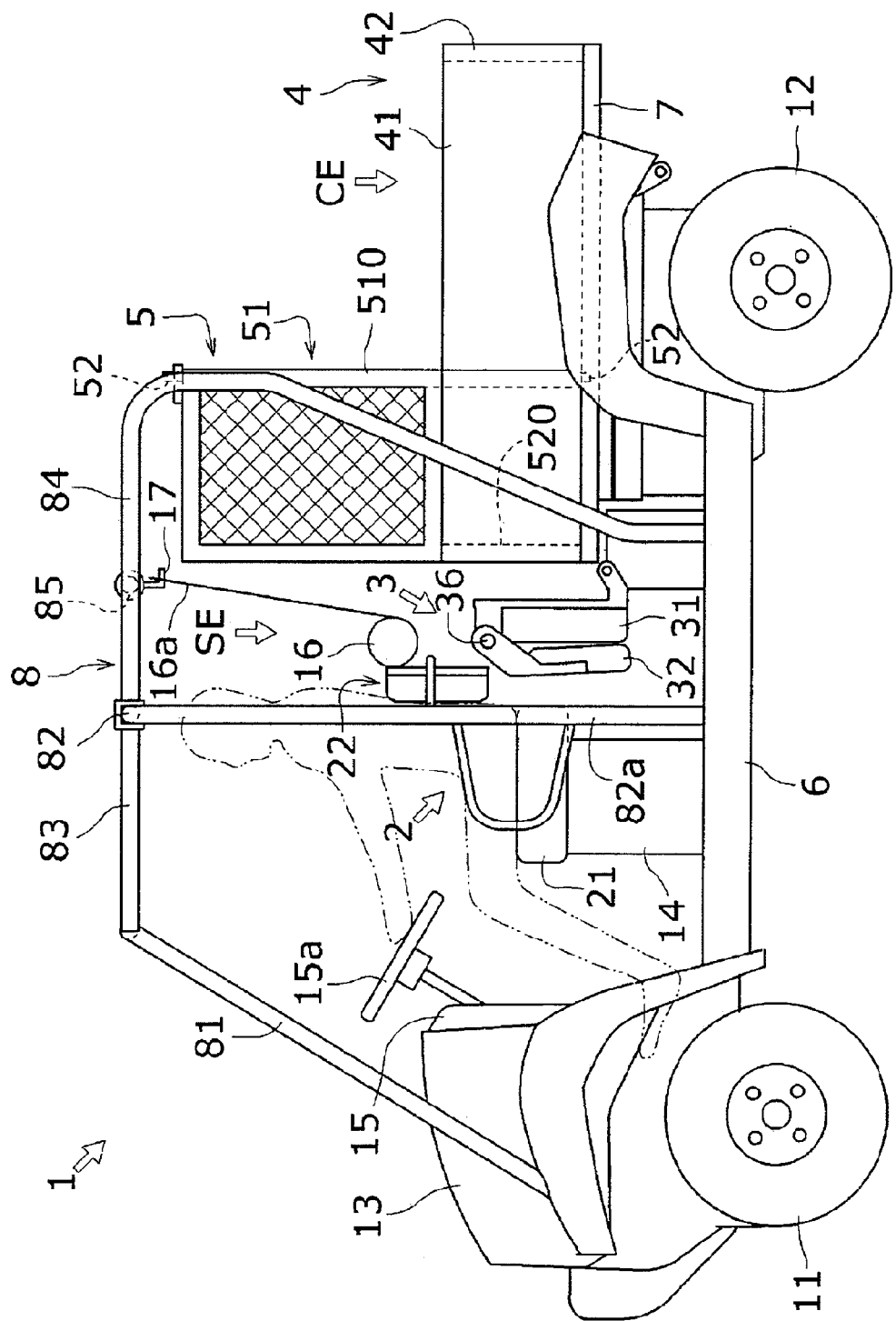
FIG. 8 is a side view which shows a pick-up type utility vehicle in a expanded state (the second embodiment).
Figure 14:
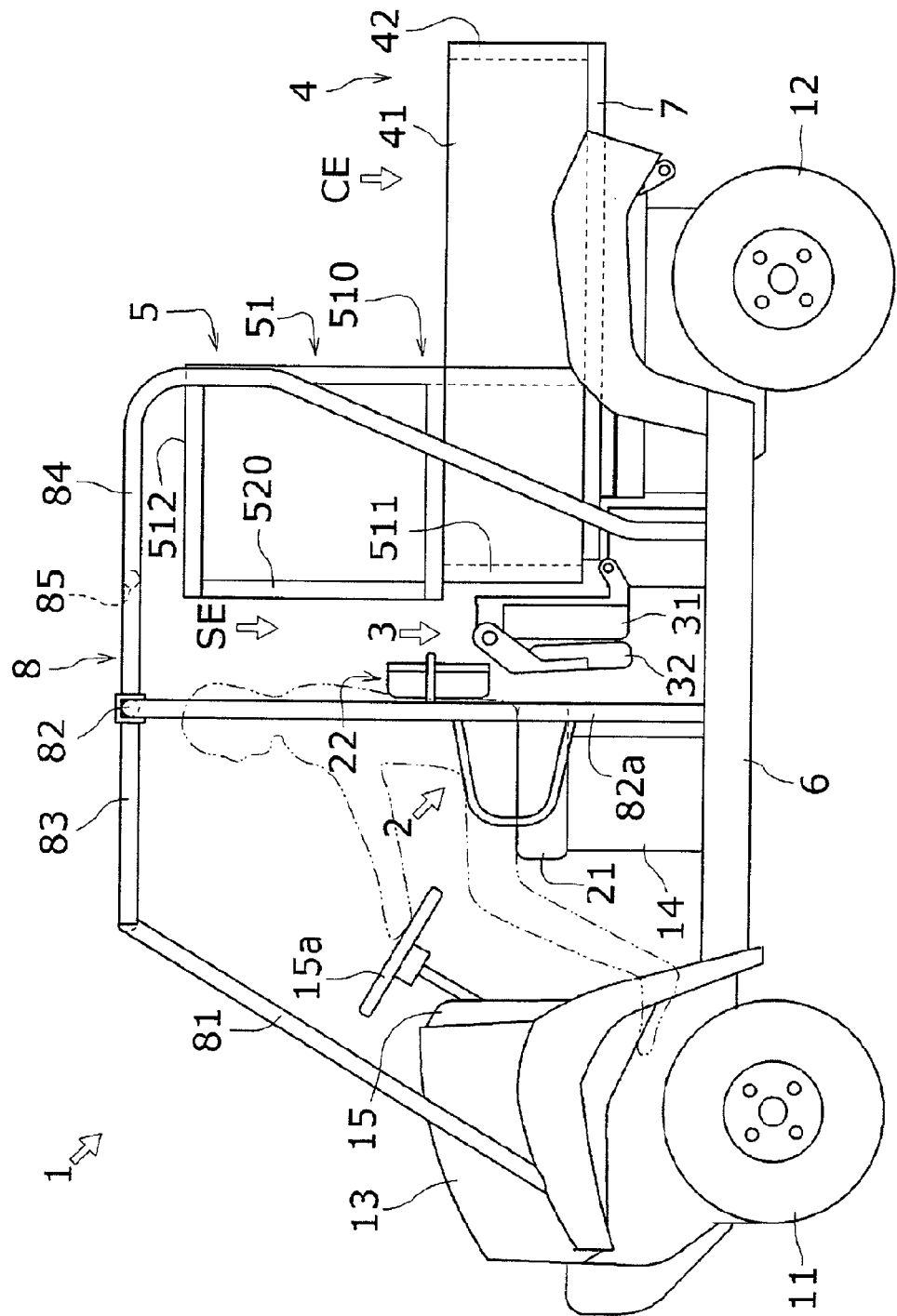
FIG. 14 is a side view which shows a pick-up type utility vehicle in an expanded state (the third embodiment).

The shunting state includes two states corresponding to the difference in the posture of the backrest 32. Each of the facing state or the standing state is one form of the shunting state. The standing state is a state where the backrest 32 is on the main seat 31 by rotating the backrest 32 relative to the main seat 31 (FIG. 3, FIG. 4 and so on). The facing state is a state where the seat cushion 31b and the backrest cushion 32b are facing each other by rotating the backrest 32 relative to the main seat 31 (FIG. 8, FIG. 14 and so on). In the first embodiment, the shunting state means the standing state.

The constitution (a1) is that shown in FIG. 1, where the rear seat 3 is configured to be able to be fixed in the standing state where the backrest 32 is standing on the main seat 31 which is standing.

As the constitution (a1), concretely speaking, a locking mechanism is set to the main seat 31 and the backrest 32. Alternatively, a friction resistance member is arranged between the seat backboard 31a and the backrest backboard 32a, and the horizontal shaft 36, to prevent the backrest 32 from rotating relative to the main seat 31.

Next, the plate part 4 and the screen formation 5 are explained. The plate part 4 and the screen formation 5 are the components configuring the cargo bed and the screen.

FIG. 2 is a front perspective view of the screen formation 5 in the normal state. In FIG. 2, stationary side plates 41, 41 are arranged at the right and left end portions of the bottom plate 7, and the rear plate 42 is arranged at the rear end portion of the bottom plate 7. The side plates 41, 41 and the rear plate 42 configure the plate part 4 (FIG. 1).

In FIG. 2, the screen formation 5 is made of two screen formation divisions 51, 51 which are arranged at right and left. In the positional relation of FIG. 2, the right end portion of the screen formation division 51 of the right side is rotatably supported around a vertical shaft 52 by the right end portion of the bottom plate 7 and the L-shaped member 84 (FIG. 1) of the right side. Similarly, in the positional relation of FIG. 2, the left end portion of the screen formation division 51 of the left side is rotatably supported around the vertical shaft 52 by the left end portion of the bottom plate 7 and the L-shaped member 84 (FIG. 1) of the left side. Depending on the arrangement mentioned above, the two screen formation divisions 51, 51 configure a double door.

It is preferable to place a locking part between the two screen formation divisions 51, 51. The locking part has a pin which is movable between a locking position and a released position. When the pin is in the locking position, the two screen formation divisions 51, 51 are kept in a closed state. When the pin is in the released position, the two screen formation divisions 51, 51 become openable and closable.

Next, the normal state and the expanded state are explained in detail. The normal state is shown in FIG. 1 and FIG. 2, the expanded state is shown in FIG. 3 and FIG. 4. FIG. 3 is a front perspective view showing the screen formation 5 in the expanded state. FIG. 4 is a side view showing the pick-up type utility vehicle 1 in the expanded state. In the normal state and the expanded state, a state of the rear seat 3, the component of the cargo bed, a space of the cargo bed, and the component of the screen change.

As shown in FIG. 1, when the pick-up type utility vehicle 1 is in the normal state, the rear seat 3 is in the use state.

As shown in FIG. 2, when the pick-up type utility vehicle 1 is in the normal state, the two screen formation divisions 51, 51 are closed. The cargo bed CN in the normal state (the normal state the cargo bed) is made of the bottomplate 7, the two stationary side plate 41, 41, the rear plate 42, and the two screen formation divisions 51, 51 which are closed. Here, "closed" indicates a state where the two screen formation divisions 51, 51 are closing the front of the cargo bed CN in the normal state.

The two screen formation divisions 51, 51 which are closed configure, in the normal state, the screen SN which separates the rear seat 3 and the cargo bed CN in the normal state. As the highest position of the two screen formation divisions 51, 51 is higher than the highest position of the front seat 2, the two screen formation divisions 51, 51 effectively function as a screen.

As shown in FIG. 3 and FIG. 4, when the pick-up type utility vehicle 1 is in the expanded state, the rear seat 3 is in the standing state (the shunting state). Empty space is formed on the front portion of the bottom plate 7, by shunting the rear seat 3 forward. In the shunting state, a passenger cannot ride on the rear seat 3.

The cargo bed CE in the expanded state (the expanded state the cargo bed) is made of the bottom plate 7, the two stationary side plates 41, 41, the rear plate 42, the two screen formation divisions 51, 51 which are opened, and the main seat 31 of the rear seat 3. Here, "opened" indicates a state where the two screen formation divisions 51, 51 are open at the front of the cargo bed CE in the expanded state. Each of the two screen formation divisions 51, 51, which are opened, configures an expanded side plate.

The cargo bed CE in the expanded state is opened forward by the two screen formation divisions 51, 51, but is closed by the rear seat 3. Therefore, the rear seat 3 in the shunting state configures a screen SE in the expanded state which separates the front seat 2 and the cargo bed CE in the expanded state.

According to the first embodiment, a passenger can move between the use state and the shunting state, and the passenger can change their state between the normal state and the expanded state by rotating the two screen formation divisions 51, 51 around the vertical shafts 52, 52. Therefore, the passenger does not have to lift heavy loads to change the state of vehicle 1 between the normal state and the expanded state. Therefore, one worker can easily perform the work of expanding the cargo bed and the work of shrinking the cargo bed by himself.

According to the constitution (a), the screen SE in the expanded state can be configured by using the rear seat 3.

Particularly, according to the constitution (a1), the screen SE in the expanded state can be configured effectively by using the rear seat 3. The rear seat 3 in the standing state functions effectively as a screen, because the highest position of the rear seat 3 in the standing state is higher than the highest position of the front seat 2.

Second Embodiment

FIGS. 5-8 show the second embodiment of the pick-up type utility vehicle 1. The second embodiment has the constitutions (a), (b), (b1), and (c) as constitutions concerning the cargo bed and the screen. The second embodiment and the first embodiment are similar except for the constitutions (b), (b1), and (c). In the second embodiment, the same symbols are used for the parts which are common to the first embodiment. The explanation of the constitution (a) is omitted.

Figure 5:
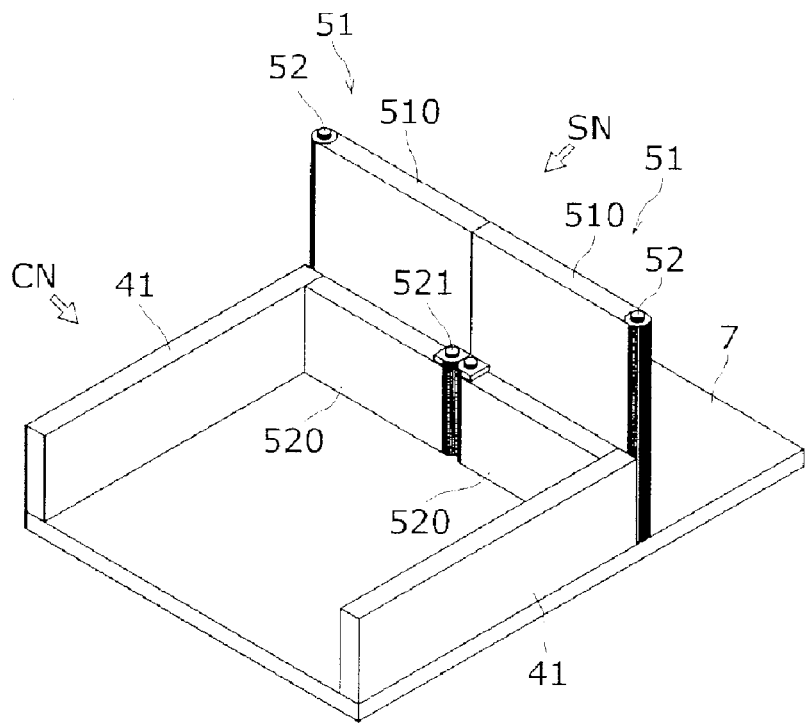
FIG. 5 is a rear perspective view which shows a screen formation in a normal state (the second embodiment).
Figure 6:
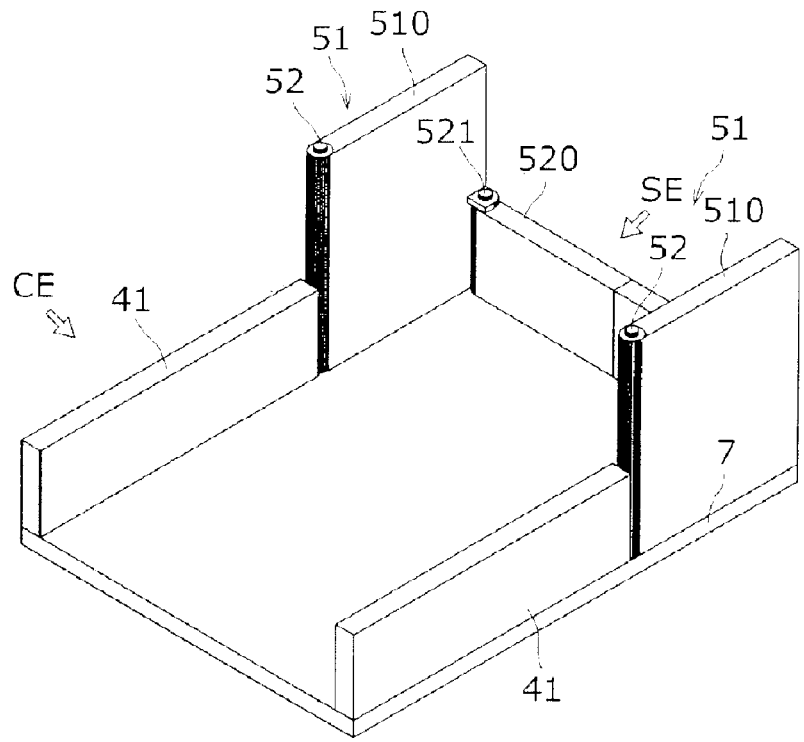
FIG. 6 is a rear perspective view which shows the screen formation in an expanded state (the second embodiment).

FIG. 5 is a rear perspective view which shows the screen formation 5 in the normal state. FIG. 6 is a rear perspective view which shows the screen formation 5 in the expanded state.

The constitution (b) is that in FIG. 5 and FIG. 6, each of the screen formation divisions 51 is made of a first screen formation section 510 which is rotatably supported around the vertical shaft 52 by the bottom plate 7 (the chassis 6) on the outside of the right and left direction, and a second screen formation section 520 which is rotatably supported around the vertical shaft 521 by the first screen formation section 510 on the inside of the right and left direction.

In the constitution (b1), the second screen formation section 520 is arranged at the under portion of the screen formation division 51.

Figure 7:
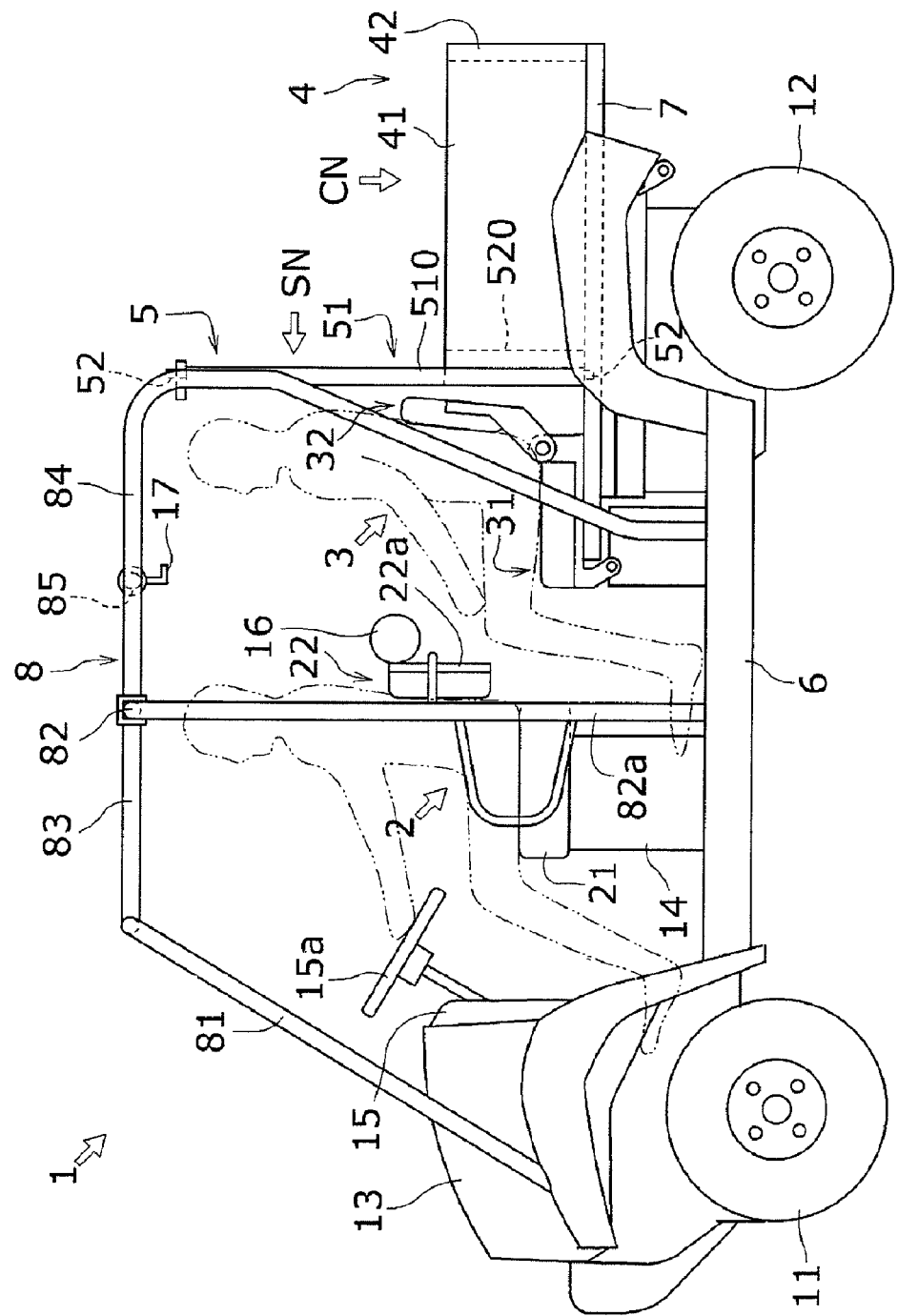
FIG. 7 is a side view which shows a pick-up type utility vehicle in a normal state (the second embodiment).

FIG. 7 is a side view which shows the pick-up type utility vehicle 1 in the normal state. FIG. 8 is a side view which shows the pick-up type utility vehicle 1 in the expanded state.

The constitution (c) is that in FIGS. 7 and 8, the pick-up type utility vehicle 1 has a cover roll 16 which can roll out a cover 16a along the vertical direction between the front seat 2 and the rear seat 3.

In the second embodiment, the cover roll 16 is supported by the backrest backboard 22a of the front seat 2. In addition, a hook 17 is supported by the accouplement 85 in a roof part of the cabin frame 8. The hook 17 is a latching part for latching the tip of the cover 16a. The hook 17 is located on the upper side of the backrest backboard 22a between the front seat 2 and the rear seat 3. In addition, the positions of the cover roll 16 and the hook 17 may be reversed. In other words, the cover roll 16 may be supported by the accouplement 85 and the hook 17 may be fixed to the backrest backboard 22a.

The normal state and the expanded state in the second embodiment are explained in detail below.

As shown in FIG. 7, when the pick-up type utility vehicle 1 is in the normal state, the two first screen formation sections 510, 510 are closing the cargo bed CN in the normal state. In addition, each of the second screen formation sections 520 is stored in each of the corresponding first screen formation section 510. In other words, all of the two screen formation divisions 51, 51 are positioned along the right and left direction. Therefore, the two screen formation divisions 51, 51 configure the screen SN in the normal state.

As shown in FIG. 8, when the pick-up type utility vehicle 1 is in the expanded state, the rear seat 3 is in the facing state (the shunting state).

In the expanded state, the two first screen formation sections 510, 510 are opening the front of the cargo bed CE in the expanded state. On this occasion, the two first screen formation sections 510, 510 configure expanded side plates in the cargo bed CE in the expanded state. In addition, in the expanded state, each of the second screen formation sections 520 spreads out from the corresponding first screen formation section 510. As a result, the two second screen formation sections 520, 520 close the front of the cargo bed CE in the expanded state. On this occasion, the two second screen formation sections 520, 520 configure the under portion of the screen SE in the expanded state. In addition, the tip of the cover 16a which is pulled out from the cover roll 16 is latched by the hook 17. On this occasion, the cover 16a, which is rolled out along the vertical direction, configures the upper portion of the screen SE in the expanded state.

According to the constitution (b), the screen SN in the normal state and the screen SE in the expanded state can be configured by using the screen formation 5.

According to the constitutions (b1) and (c), the screen SE in the expanded state can be configured more effectively by the two second screen formation sections 520, 520 and the cover roll 16.

Third Embodiment

FIGS. 9-14 show the third embodiment of the pick-up type utility vehicle 1. The third embodiment has the constitutions (a), (b) and (b2) concerning the cargo bed and the screen. The third embodiment and the first embodiment are similar except for the constitutions (b) and (b2). The constitution (b) is common to the third embodiment and the second embodiment. In the third embodiment, the same symbols are used for the parts which are common to the first embodiment. The explanation of the constitutions (a) and (b) is omitted.

FIGS. 9-12 show four steps from the normal state to the expanded state. FIG. 9, FIG. 10, FIG. 11, and FIG. 12 show respectively the first step (the normal state), the second step, the third step, and the fourth step (the expanded state).

Figure 10:
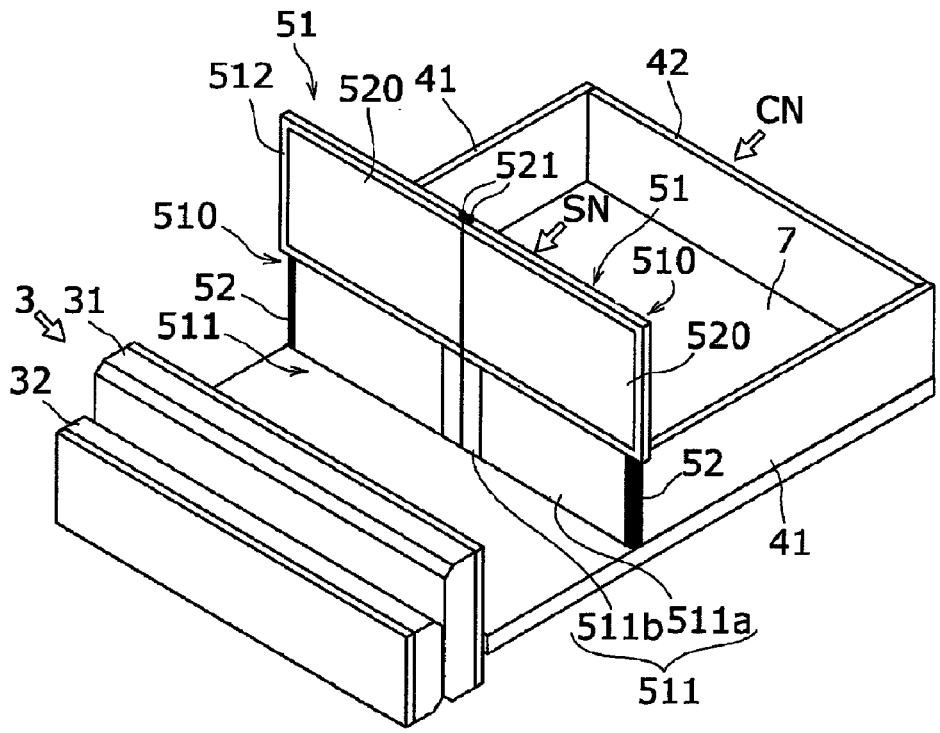
FIG. 10 is a front perspective view which shows a screen formation in the second step (the third embodiment).

In FIG. 10, the first screen formation section 510 has a dual panel 511 in the under portion and the storage frame 512 in the upper portion. The dual panel 511 is made of the side panel part 511a and the front panel 511b in the under portion. The side panel part 511a is supported by the stationary side plate 41 via the hinge 52. As the shaft of the hinge 52 is a vertical shaft, the dual panel 511 is rotatably supported around the vertical shaft by the bottom plate 7. The front panel 511b is rotatably supported by the tip portion (the inside end portion in the right and left direction) of the side panel part 511a via the vertical shaft. The storage frame 512 is fixed to the upper end of the side panel part 511a. The storage frame 512 is the U-shaped frame, and is open on the inside of the right and left direction.

In FIG. 10, the second screen formation section 520 is stored in the inside of the storage frame 512. The second screen formation section 520 is rotatably supported by the storage frame 512 via the vertical shaft 521. The vertical shaft 521 is arranged at the inside end portion of the storage frame 512.

In the constitution (b2), the second screen formation section 520 is arranged at the upper portion of the screen formation division 51.

Next, the normal state and the expanded state in the third embodiment are explained in detail.

Figure 9:
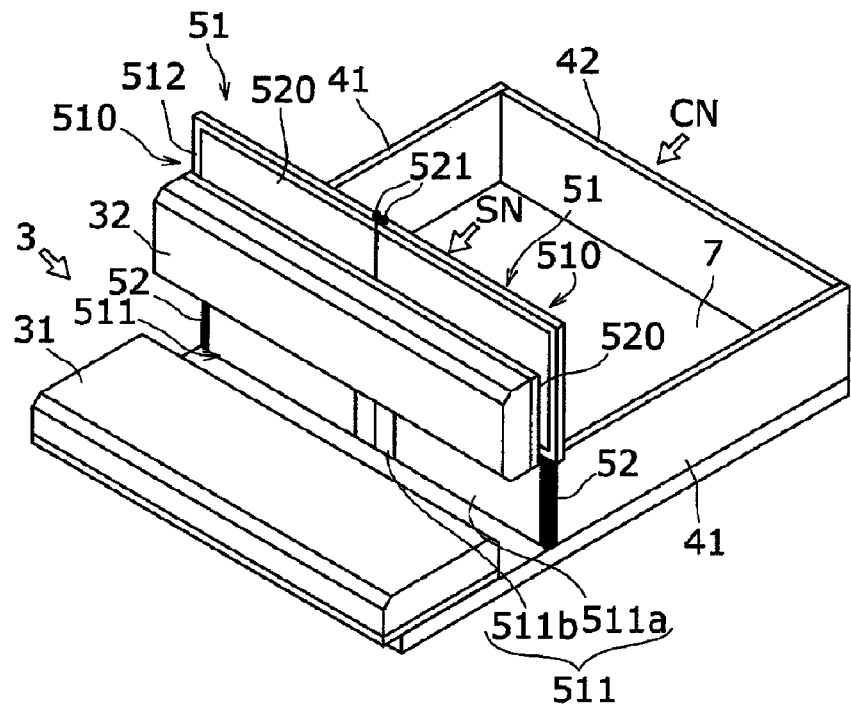
FIG. 9 is a front perspective view which shows a screen formation in the first step (a normal state) (the third embodiment).

In the first step (the normal state) shown in FIG. 9, the two screen formation divisions 51, 51 configure the screen SN in the normal state. The two first screen formation sections 510, 510 close the cargo bed CN in the normal state. Each of the second screen formation sections 520 is stored in the corresponding first screen formation section 510.

In the second step shown in FIG. 10, the rear seat 3 is in the facing state (the shunting state).

Figure 11:
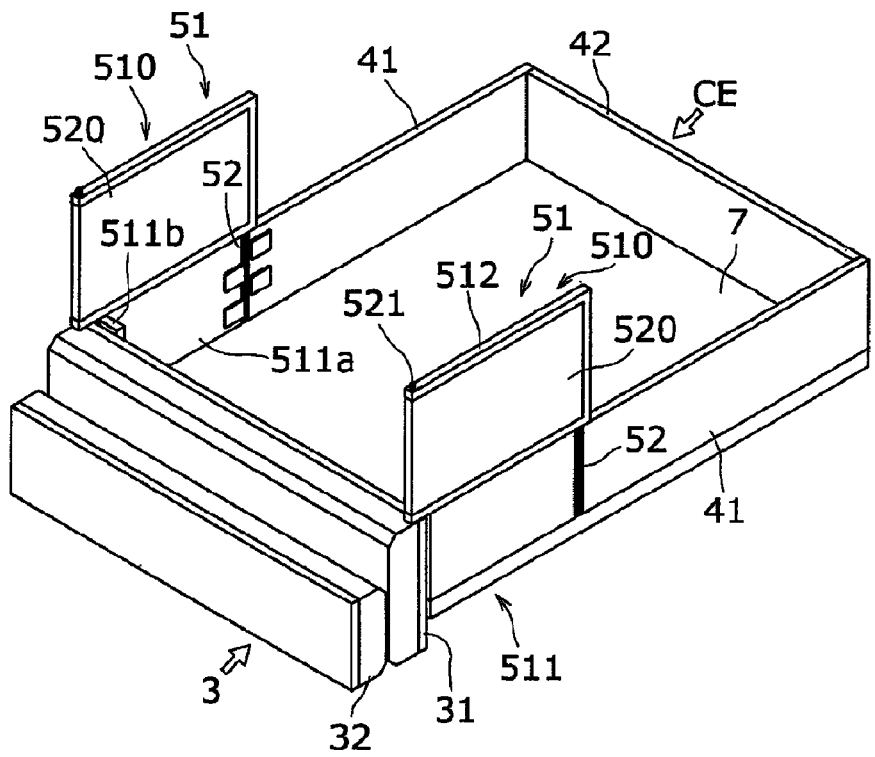
FIG. 11 is a front perspective view which shows a screen formation in the third step (the third embodiment).

In the third step shown in FIG. 11, the two first screen formation sections 510, 510 are opening the cargo bed CE in the expanded state. On this occasion, each of the side panel part 511a of the first screen formation section 510 configures the expanded side plate in the cargo bed CE in the expanded state. In addition, the rear seat 3 in the facing state is closing the front of the cargo bed CE in the expanded state. In other words, the rear seat 3 in the facing state configures the under portion of the screen SE in the expanded state. In addition, the front panel 511b is bent relative to the side panel part 511a, so that the front panel 511b is in face contact with the rear seat 3.

Figure 12:
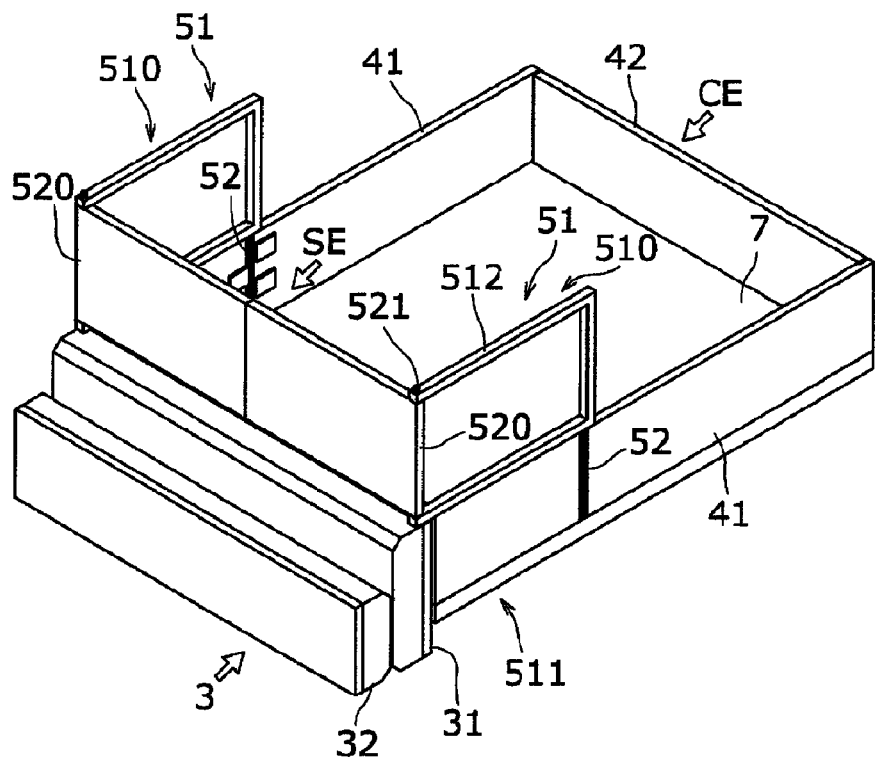
FIG. 12 is a front perspective view which shows a screen formation in the fourth step (an expanded state) (the third embodiment).
Figure 13:
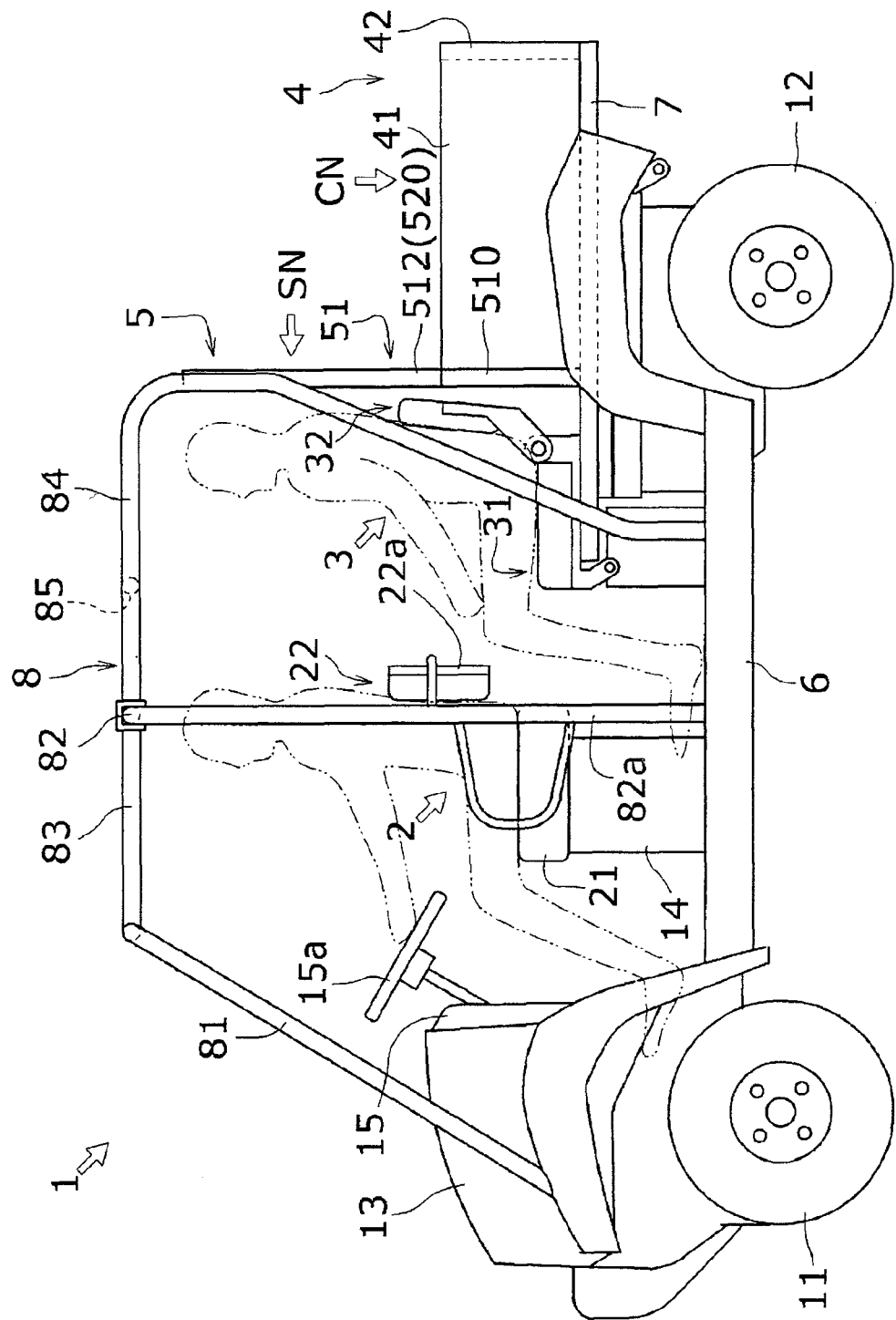
FIG. 13 is a side view which shows a pick-up type utility vehicle in a normal state (the third embodiment).

In the fourth step (the expanded state) shown in FIG. 12, each of the second screen formation sections 520 spreads out from the corresponding first screen formation section 510, so that the two second screen formation sections 520, 520 close the front of the cargo bed CE in the expanded state. Therefore, the two second screen formation sections 520, 520 form the upper portion of the screen SE in the expanded state.

According to the constitutions (a) and (b2), the screen SE in the expanded state can be configured by the two second screen formation sections 520, 520 and the rear seat 3.

Fourth Embodiment

FIGS. 15-18 show the fourth embodiment of the pick-up type utility vehicle 1. The fourth embodiment has the constitutions (a), (d) and (e), which concern the cargo bed and the screen. The fourth embodiment and the first embodiment are similar except for the constitutions (d) and (e). In the fourth embodiment, the same symbols are used for the parts which are common to the first embodiment. The explanation of the constitution (a) is omitted.

Figure 15:
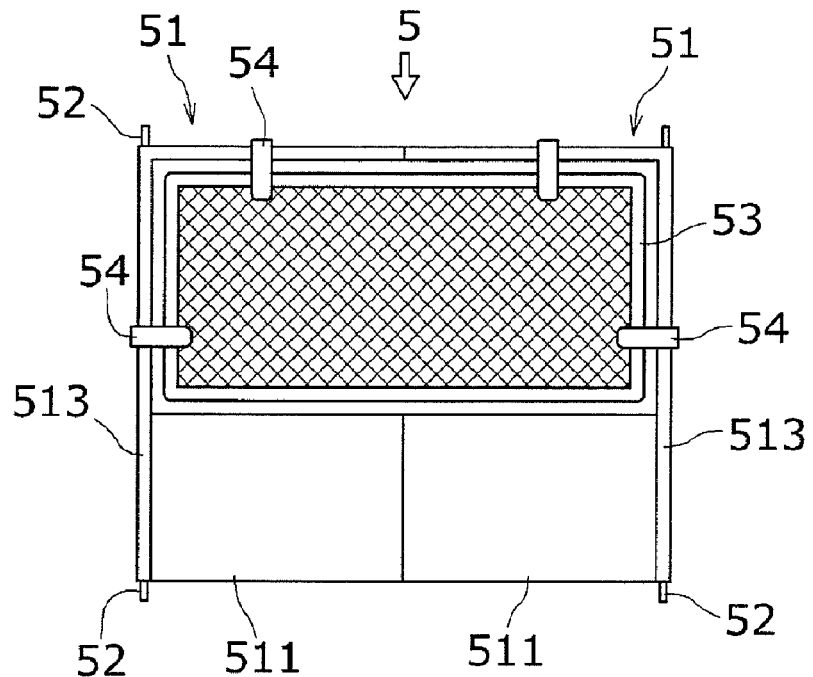
FIG. 15 is a front view which shows a screen formation (the fourth embodiment).
Figure 16:
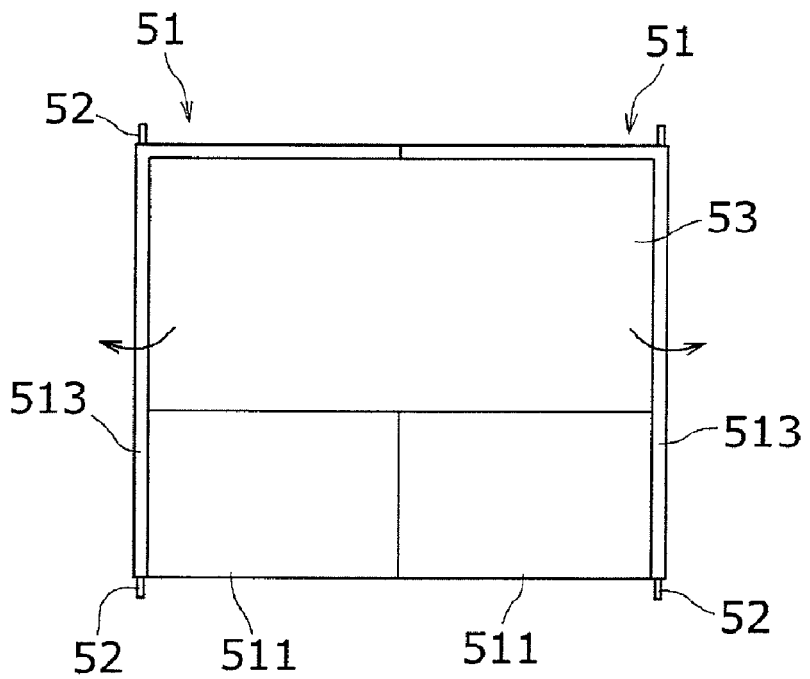
FIG. 16 is a front view which shows a screen formation that a third screen formation division is removed (the fourth embodiment).

FIG. 15 is a front view showing the screen formation 5. FIG. 16 is a front view showing the screen formation 5 with the panel 53 for the screen removed.

The constitution (d) is that in FIG. 15, the screen formation 5 has the third screen formation division (the panel 53 for the screen) which is arranged at the upper portion of the screen formation 5 and is removably supported by the two screen formation divisions 51, 51.

The screen formation division 51 has the dual panels 511 and the storage frame 513. Each of the storage frames 513 is an inverted L-shape in FIG. 15. The storage frame 513 is rotatably supported by the bottom plate 7 via the vertical shaft 52. The dual panel 511 is fixed to the under portion of the storage frame 513.

In FIG. 16, in the two screen formation divisions 51, 51, a space is formed between the two dual panels 511, 511 and the two storage frame 513, 513. The panel 53 for the screen, which is the third screen formation division, can be stored in this space.

In FIG. 15, the panel 53 for the screen is supported by the two storage frames 513, 513 with the fixing brackets 54. All of the two screen formation divisions 51, 51 and the panel 53 for the screen, in other words, the screen formation 5 is kept by one body. The fixing brackets 54 are removable. Therefore, the panel 53 can be removed from the two storage frames 513, 513 by removing the fixing brackets 54.

Figure 17:
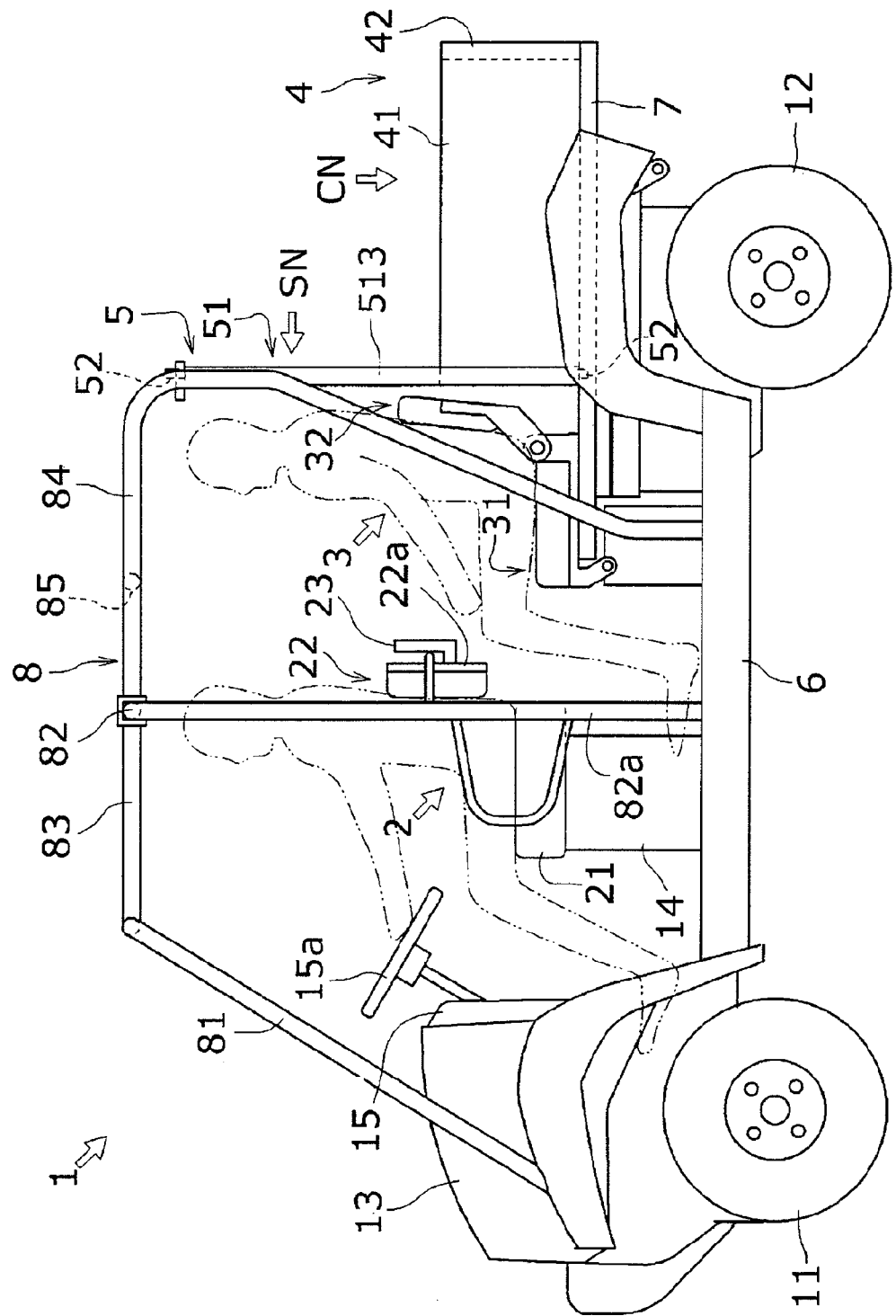
FIG. 17 is a side view which shows a pick-up type utility vehicle in a normal state (the fourth embodiment).

The constitution (e) is that in FIG. 17, the pick-up type utility vehicle 1 has the supporting part 23 for supporting the third screen formation division (the panel 53 for the screen), between the front seat 2 and the rear seat 3.

In the fourth embodiment, the supporting part 23 is fixed to the backrest backboard 22a of the front seat 2. As long as there is the supporting part 23 between the front seat 2 and the rear seat 3, the supporting part 23 may be arranged at other positions, for example, by being supported by the first U-shaped member 81 or the L-shaped members 84, 84.

The supporting part 23 is, for example, the fixing bracket which can be fixed to the backrest backboard 22a.

Next, the normal state and the expanded state in the fourth embodiment are explained in detail.

As shown in FIG. 17, when the pick-up type utility vehicle 1 is in the normal state, the screen formation 5 closes the cargo bed CN in the normal state. Thus, the screen formation 5 configures the screen SN in the normal state.

Figure 18:
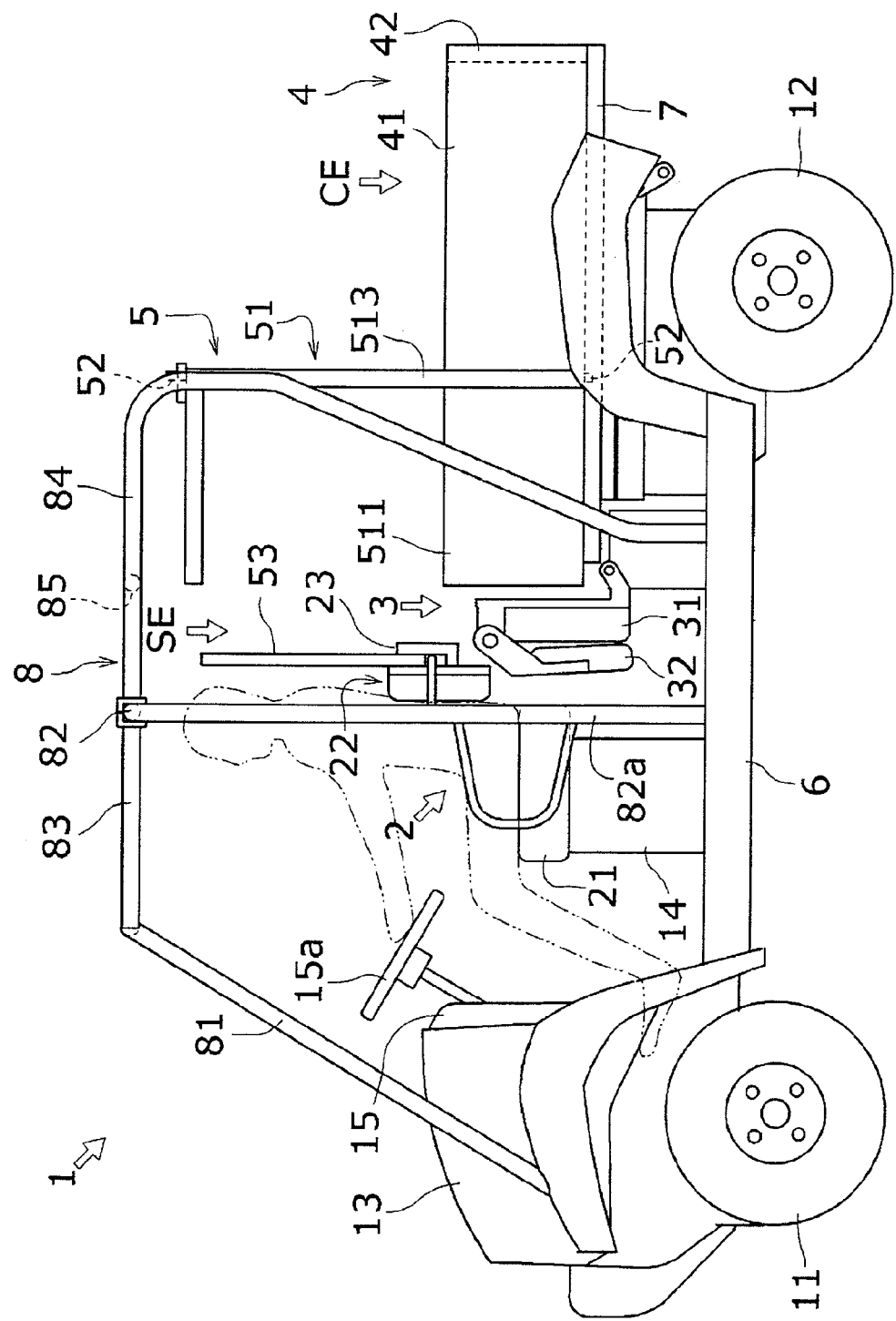
FIG. 18 is a side view which shows a pick-up type utility vehicle in an expanded state (the fourth embodiment).

As shown in FIG. 18, when the pick-up type utility vehicle 1 is the expanded state, the two screen formation divisions 51, 51 are opening the front of the cargo bed CE in the expanded state. In this state, the fixing bracket 54 is removed, and the screen formation 5 is separated into the two screen formation divisions 51, 51 and the panel 53 for the screen. The two screen formation divisions 51, 51 configure the expanded side plate in the cargo bed CE in the expanded state.

In addition, the panel 53 for the screen is supported by the backrest backboard 22a with the supporting part 23. On this occasion, the panel 53 for the screen configures the upper portion of the screen SE in the expanded state. In addition, the rear seat 3 in the facing state configures the under portion of the screen SE in the expanded state.

According to the constitutions (d) and (e), the screen SE in the expanded state can be effectively configured by the rear seat 3 and the third screen formation division (the panel 53 for the screen).

Fifth Embodiment

Figure 19:
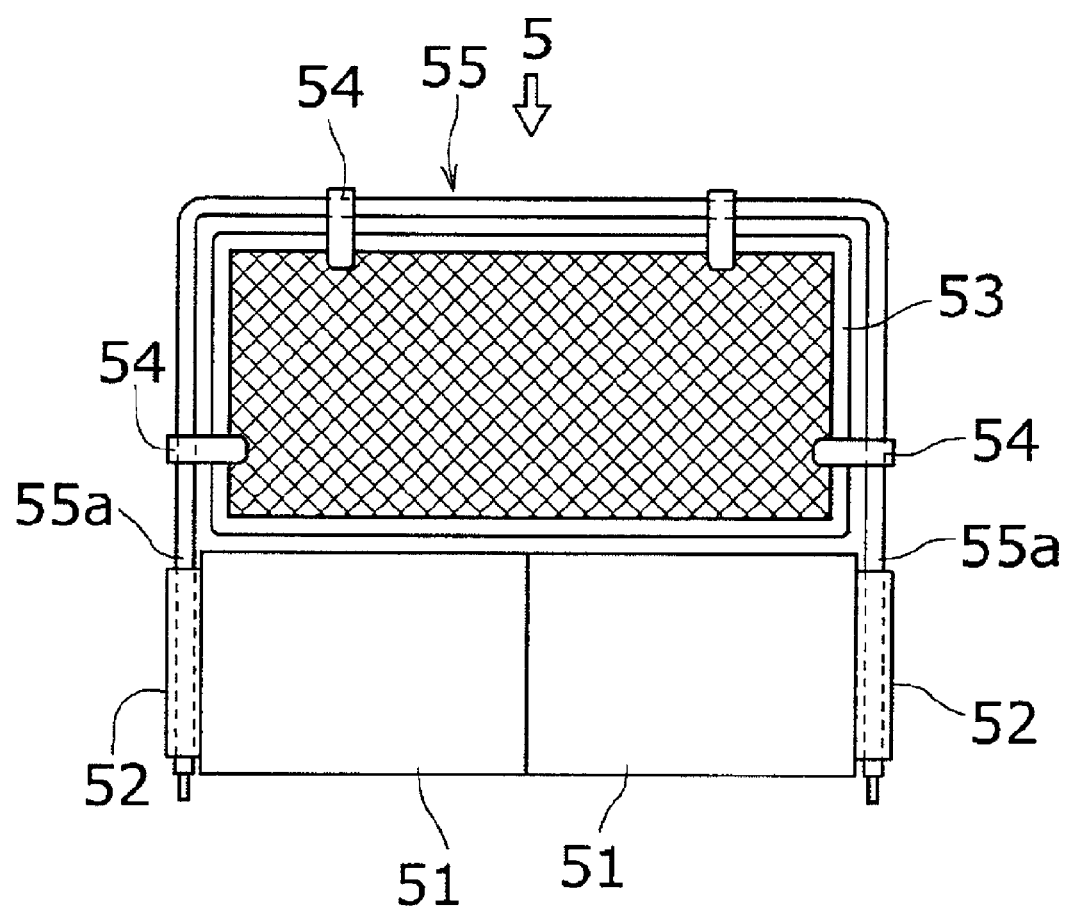
FIG. 19 is a front view which shows a screen formation (the fifth embodiment).
Figure 20:
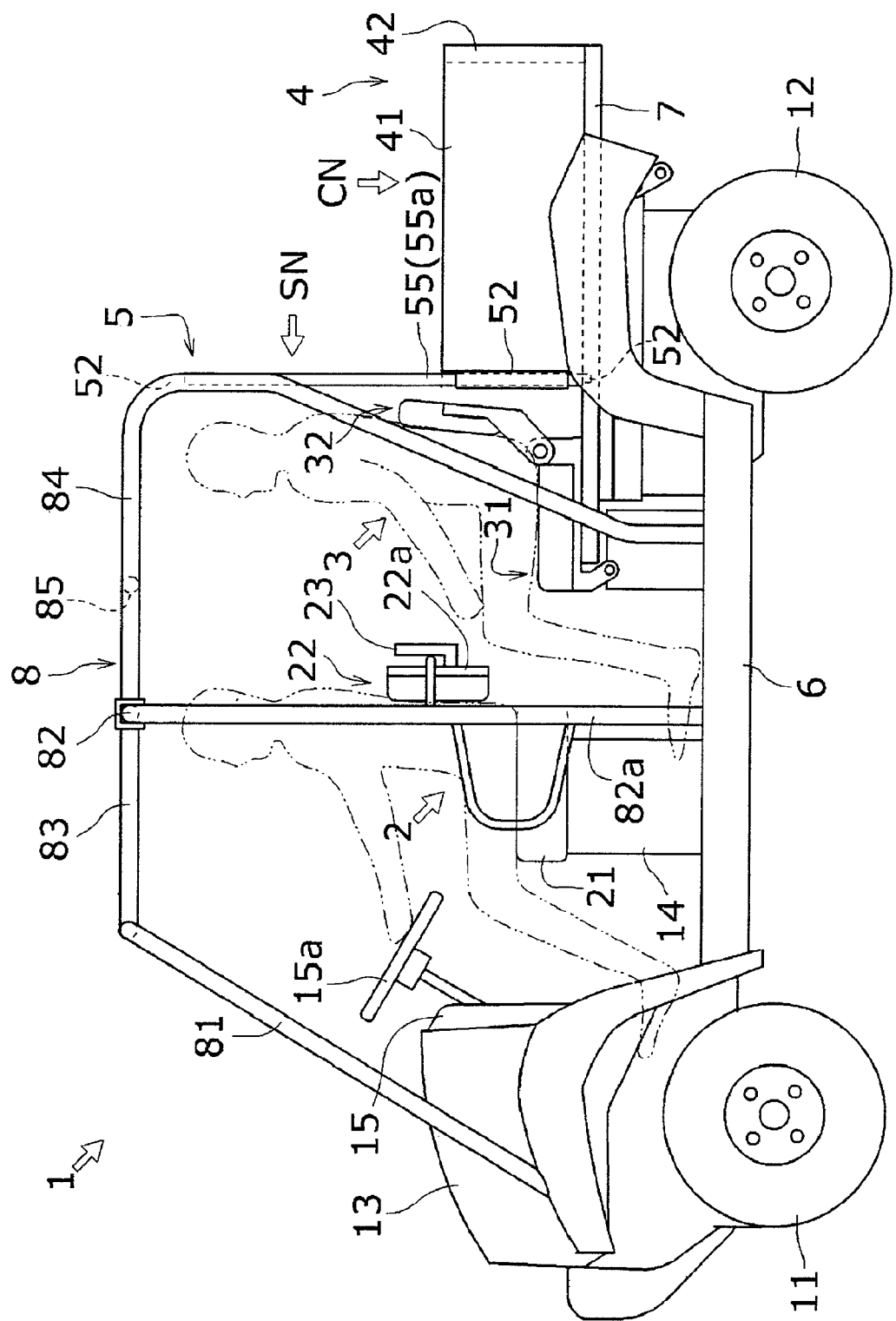
FIG. 20 is a side view which shows a pick-up type utility vehicle in a normal state (the fifth embodiment).
Figure 21:
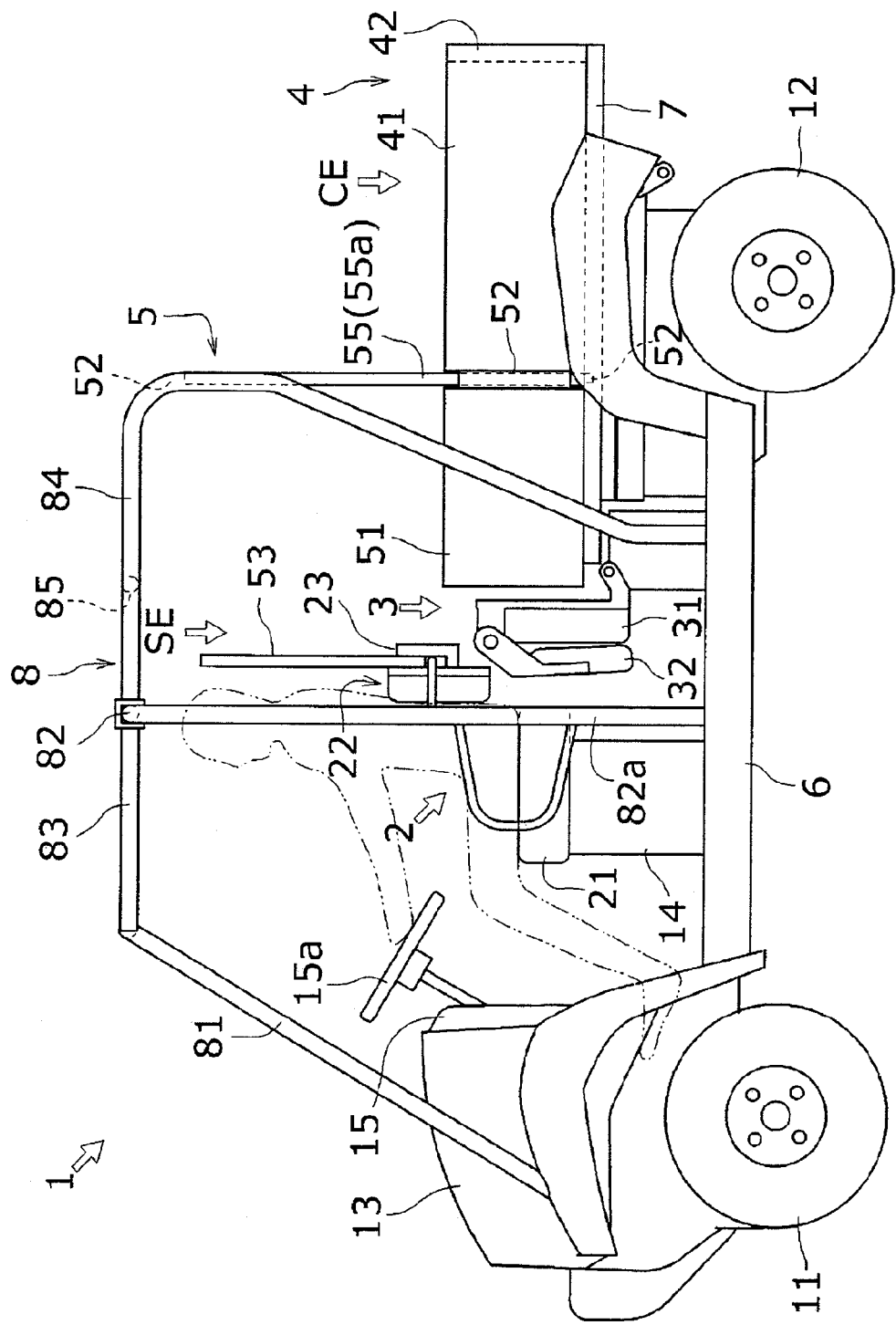
FIG. 21 is a side view which shows a pick-up type utility vehicle in an expanded state (the fifth embodiment).

FIGS. 19-21 show the fifth embodiment of the pick-up type utility vehicle 1. The fifth embodiment has the constitutions (a), (e), (f) and (g), which concern the cargo bed and the screen. The fifth embodiment and the first embodiment are similar except for the constitutions (e), (f) and (g). The constitution (e) is common to the fifth embodiment and the fourth embodiment. In the fifth embodiment, the same symbols are used for the parts which are common to the first embodiment. The explanation of the constitutions (a) and (e) are omitted.

FIG. 19 is a front view which shows the screen formation 5.

The constitution (f) is that in FIG. 19, the screen formation has the third screen formation division (the panel 53 for the screen) which is arranged at the upper portion of the screen formation 5. The third screen formation division has the screen formation supporting frame 55 which is fixed to the chassis 6 (the bottom plate 7) and rotatably supports the two screen formation divisions 51, 51, and the panel 53 for the screen which is supported by the screen formation supporting frame 55.

In the constitution (g), the third screen formation division (the panel 53 for the screen) is removably supported by the screen formation supporting frame 55.

In FIG. 19, the screen formation supporting frame 55 is U-shaped to open downward. The two screen formation divisions 51, 51 are respectively rotatably supported by the under portion in the legs 55a, 55a of the screen formation supporting frame 55 via the rotary shaft 52 which is cylindrical. In the screen formation 5, a space is formed between the two screen formation divisions 51, 51 and the screen formation supporting frame 55. The panel 53 for the screen can be stored in this space.

The panel 53 for the screen is supported by the screen formation supporting frame 55 with the fixing brackets 54. The fixing bracket 54 is removable.

Next, the normal state and the expanded state in the fifth embodiment are explained in detail below.

As shown in FIG. 20, when the pick-up type utility vehicle 1 is in the normal state, the screen formation 5 closes the cargo bed CN in the normal state. In this state, the screen formation 5 configures the screen SN in the normal state.

As shown in FIG. 21, when the pick-up type utility vehicle 1 is in the expanded state, the two screen formation divisions 51, 51 are open the front of the cargo bed CE in the expanded state. The two screen formation divisions 51, 51 form the expanded side plate in the cargo bed CE in the expanded state.

In addition, the panel 53 for the screen is supported by the supporting part 23. On this occasion, the panel 53 for the screen configures the upper portion of the screen SE in the expanded state. In addition, the rear seat 3, in the facing state, configures the under portion of the screen SE in the expanded state.

According to the constitution (f), the screen SE in the expanded state can be configured by the rear seat 3 and the panel 53 for the screen.

According to the constitutions (e) and (g), the screen SE in the expanded state can be effectively configured by the rear seat 3 and the panel 53 for the screen.

Sixth Embodiment

FIGS. 22-25 show the sixth embodiment of the pick-up type utility vehicle 1. The sixth embodiment has the constitutions (a), (f) and (h), which concern the cargo bed and the screen. The sixth embodiment and the first embodiment are similar except for the constitutions (f) and (h). In the sixth embodiment, the same symbols are used for the parts which are common to the first embodiment. The constitution (f) is common to the sixth embodiment and the fifth embodiment. In the sixth embodiment, the same symbols are used for the parts which are common to the first embodiment. The explanation of the constitution (a) is omitted.

Figure 22:
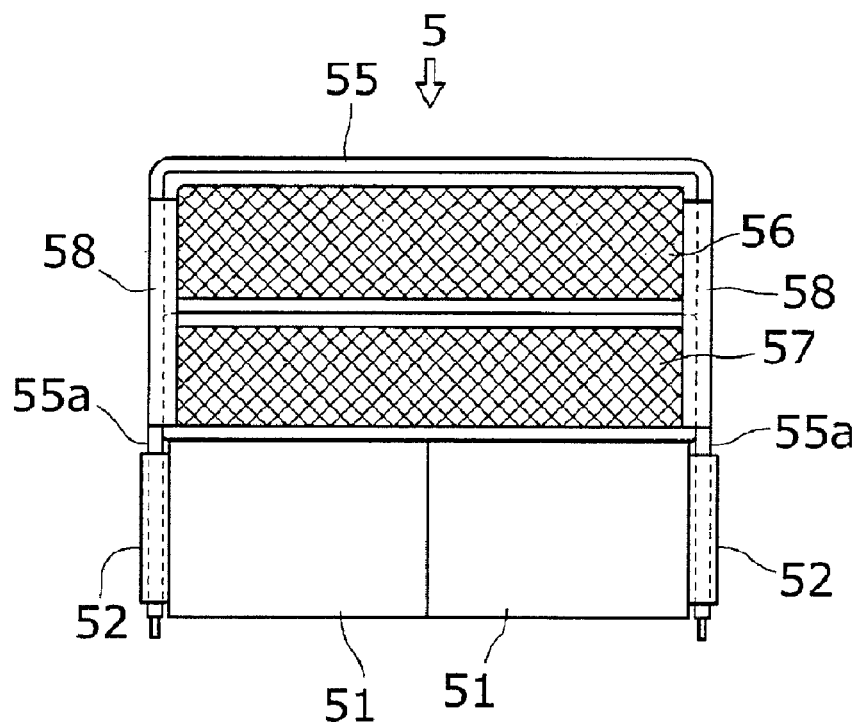
FIG. 22 is a front view which shows a screen formation in a normal state (the sixth embodiment).
Figure 23:
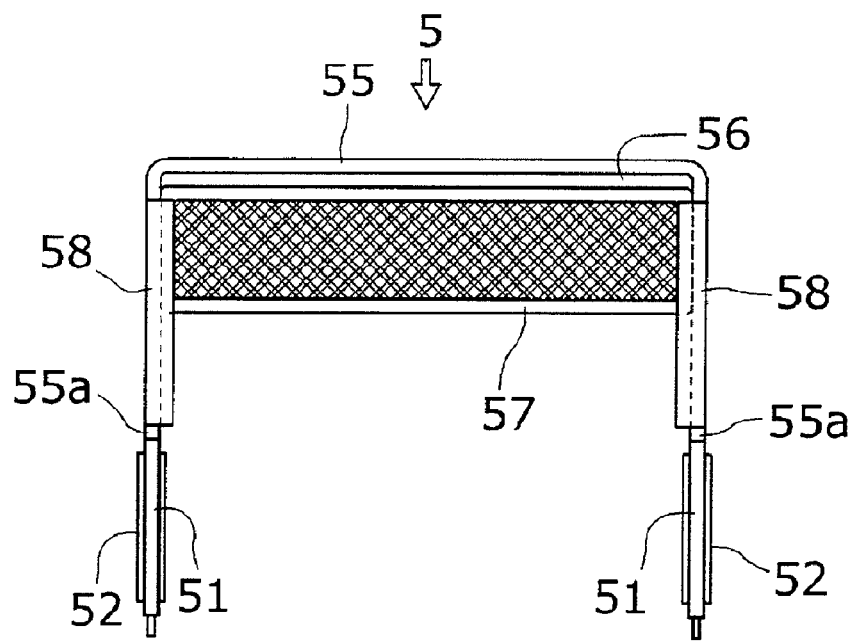
FIG. 23 is a front view which shows a screen formation in an expanded state (the sixth embodiment).

FIG. 22 is a front view showing the screen formation 5 in the normal state. FIG. 23 is a front view which shows the screen formation 5 in the expanded state.

The constitution (f) is that shown in FIG. 22, the screen formation 5 has the third screen formation division which is arranged at the upper portion of the screen formation 5. The third screen formation division has the screen formation supporting frame 55 which is fixed to the chassis 6 (the bottom plate 7) and rotatably supports the two screen formation divisions 51, 51, and the panels (56, 57) for the screen which are supported by the screen formation supporting frame 55.

In the constitution (h), the screen has an upper stationary panel part 56 which is fixed to the screen formation supporting frame 55, and the under movable panel part 57 which is supported slidably in the vertical direction by the screen formation supporting frame 55.

In FIG. 22, the screen formation supporting frame 55 is U-shaped to open downward. The two screen formation divisions 51, 51 are respectively rotatably supported by the under portion in the legs 55a, 55a of the screen formation supporting frame 55 via the rotary shaft 52 which is cylindrical. The upper stationary panel part 56 is arranged at the upper portion of the screen formation supporting frame 55. In FIG. 22, the under movable panel part 57 is arranged between the upper stationary panel part 56 and the two screen formation divisions 51, 51 which are on the downside. In addition, the sliding guider 58 is fixed to each of the leg 55*a* of the screen formation supporting frame 55. The two sliding guiders 58, 58 slidably support the under movable panel part 57 in the vertical direction.

As shown in FIG. 23, the under movable panel part 57 can overlap the upper stationary panel part 56 by moving the under movable panel part 57 to the upper side. In this state, a space is formed between the upper stationary panel part 56 and the two screen formation divisions 51, 51 which are on the downside.

Next, the normal state and the expanded state in the sixth embodiment are explained in detail below.

Figure 24:
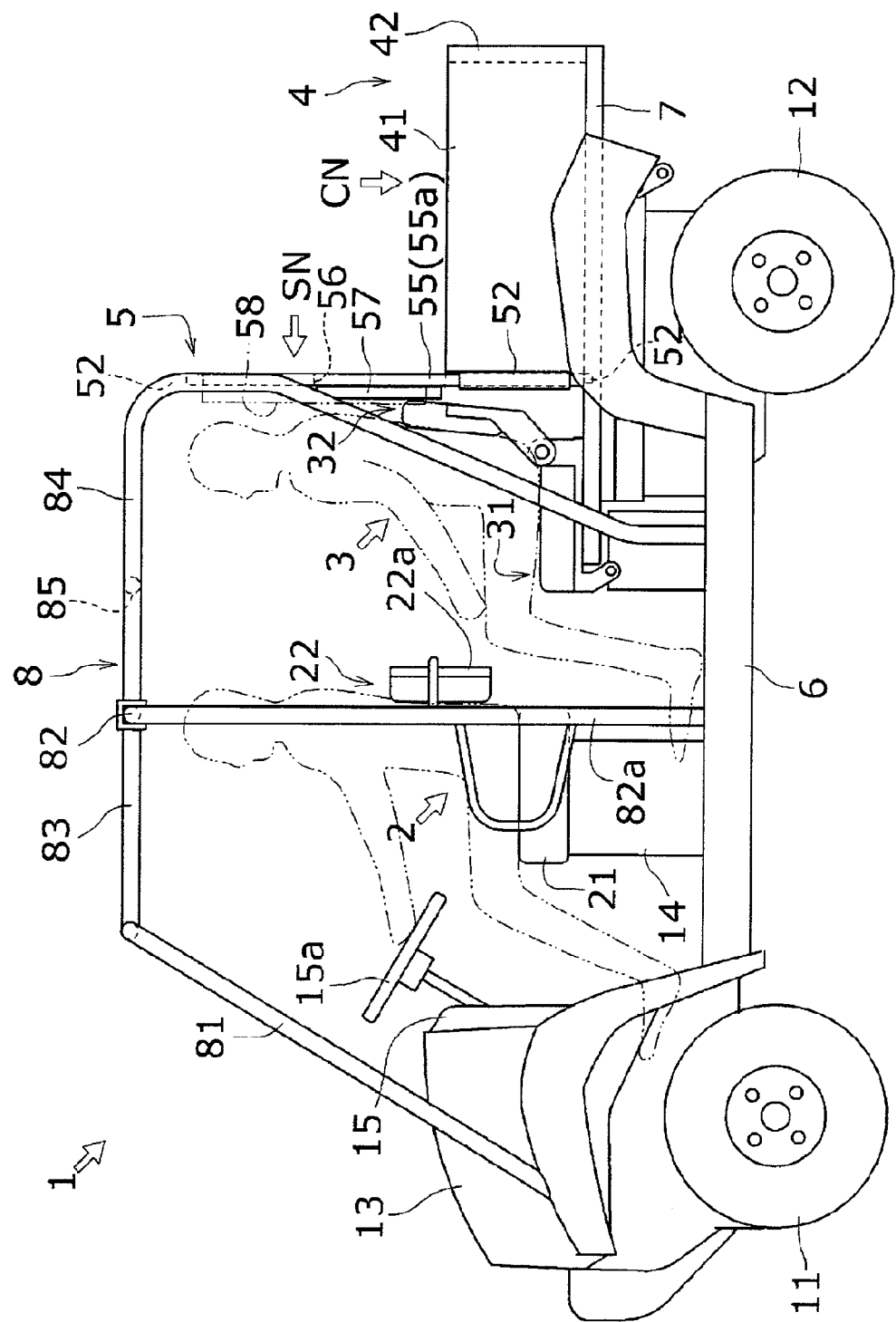
FIG. 24 is a side view which shows a pick-up type utility vehicle in a normal state (the sixth embodiment).

As shown in FIG. 24, when the pick-up type utility vehicle 1 is in the normal state, the screen formation 5 closes the cargo bed CN in the normal state. Thus, the screen formation 5 configures the screen SN in the normal state.

Figure 25:
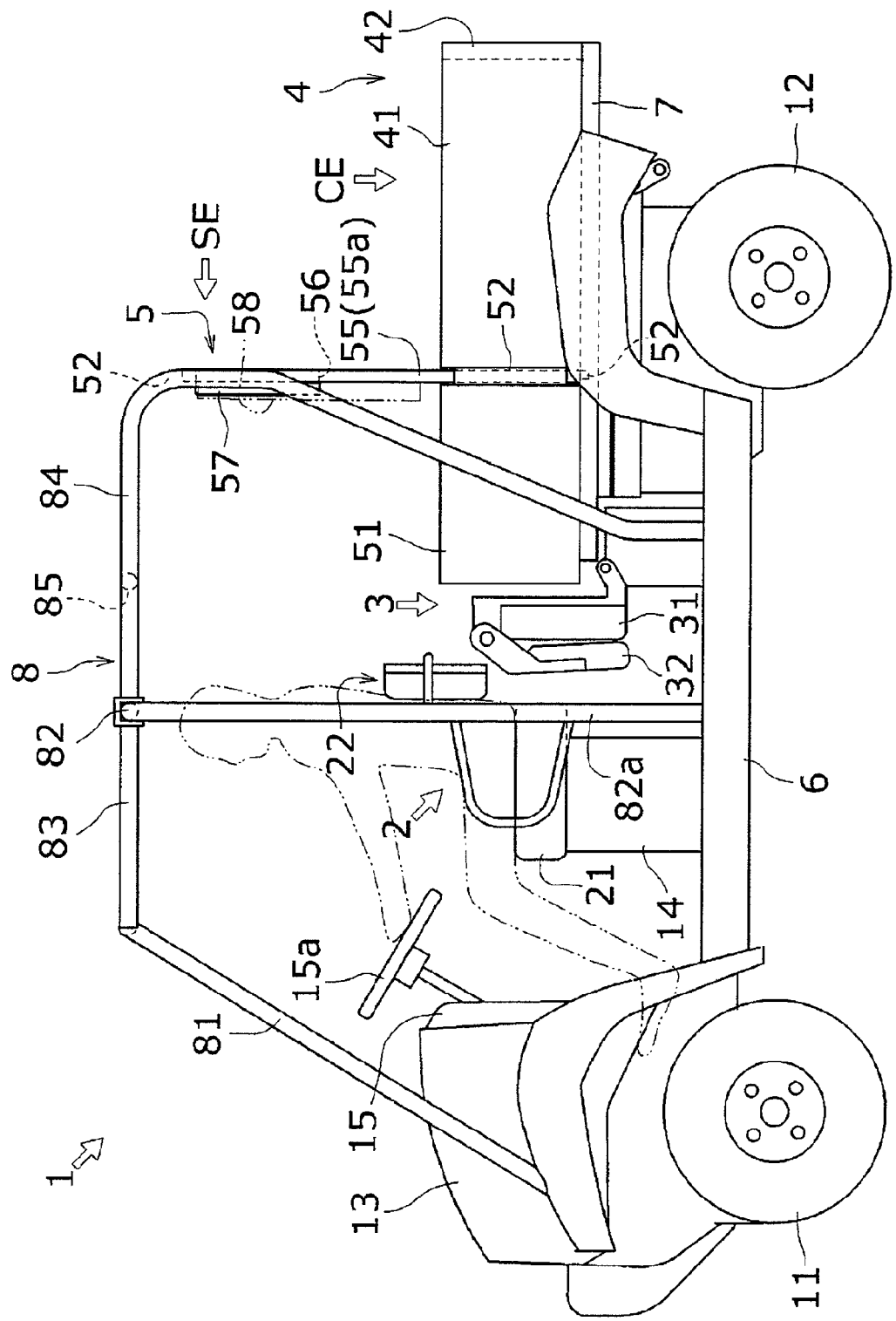
FIG. 25 is a side view which shows a pick-up type utility vehicle in an expanded state (the sixth embodiment).
Figure 26:
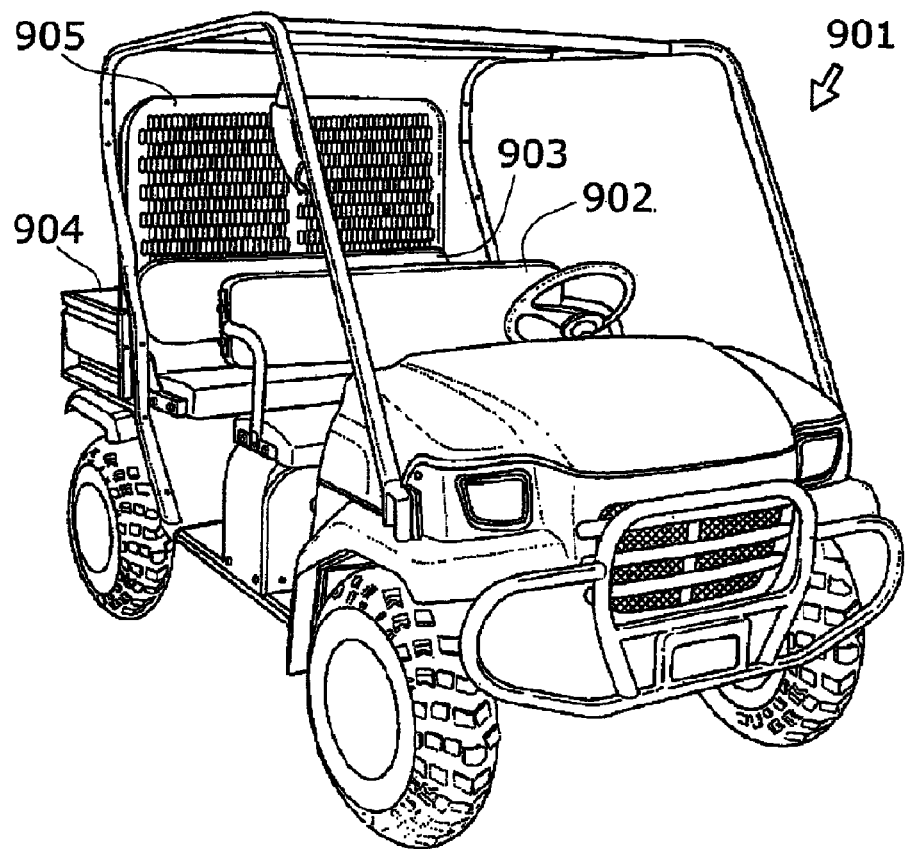
FIG. 26 is perspective illustration which shows a known pick-up type utility vehicle (Prior Art).
Figure 27:
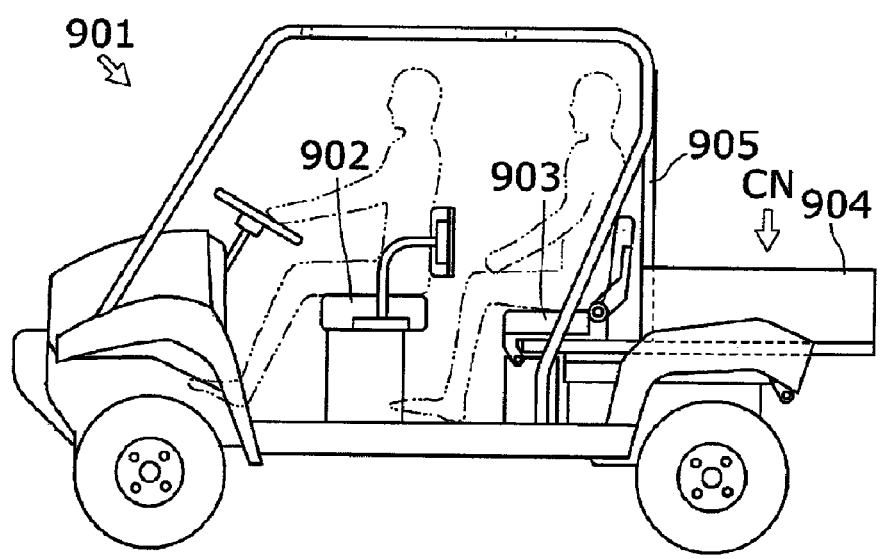
FIG. 27 is a side view which shows the pick-up type utility vehicle shown in FIG. 26 in the normal state (Prior Art).
Figure 28:
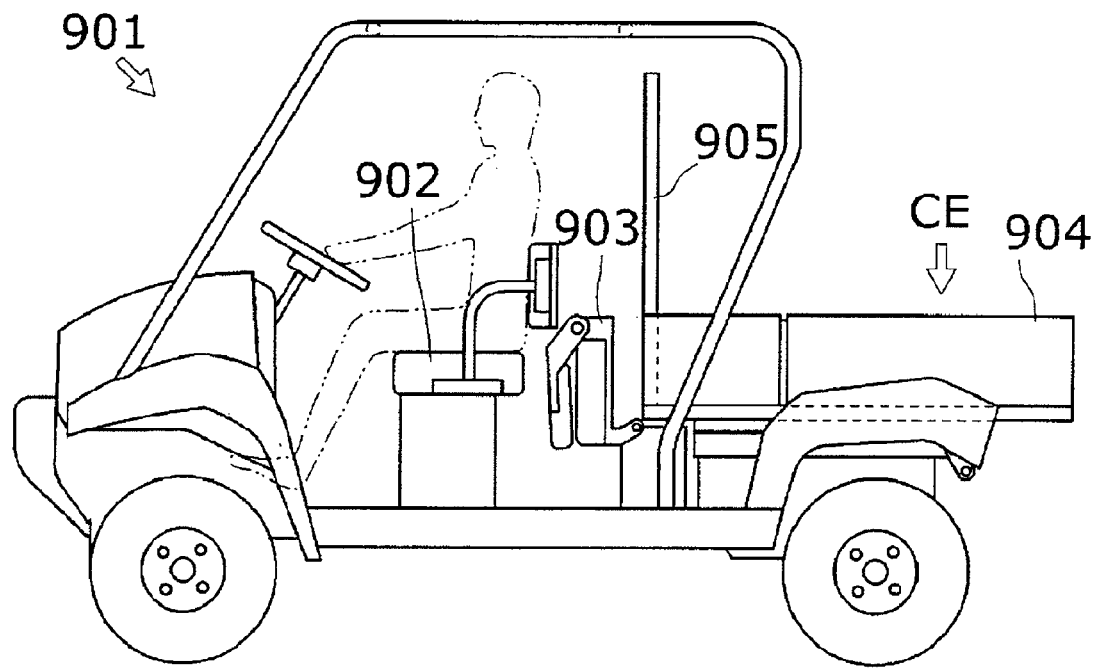
FIG. 28 is a side view which shows the pick-up type utility vehicle shown in FIG. 26 in the expanded state (Prior Art).
Figure 29:
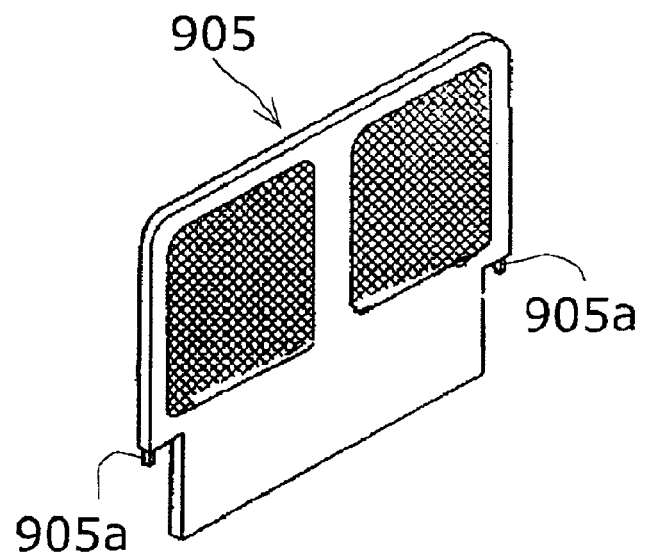
FIG. 29 is a diagrammatic perspective view which shows a known screen formation (Prior Art).

As shown in FIG. 25, when the pick-up type utility vehicle 1 is in the expanded state, the two screen formation divisions 51, 51 open the front of the cargo bed CE in the expanded state. The two screen formation divisions 51, 51 form the expanded side plate in the cargo bed CE in the expanded state. In addition, the under movable panel part 57 overlaps the upper stationary panel part 56 by moving the under movable panel part 57 to the upper side. Shunting the under movable panel part 57 to the upper side prevents the under movable panel part 57 from narrowing the capacity of the cargo bed CE in the expanded state On the other hand, the position of the upper stationary panel part 56, which configures the upper portion of the screen formation 5, is stationary in the normal state and the expanded state. The upper stationary panel part 56 forms the upper portion of the screen in both the normal state and the expanded state. In addition, the rear seat 3 in the facing state configures the under portion of the screen SE in the expanded state.

In addition, shunting the under movable panel part 57 to the upper side is only for enlarging the capacity of the cargo bed CE in the expanded state. For example, both of the upper stationary panel part 56 and the under movable panel part 57 can be used as a screen by positioning the under movable panel part 57 under the upper stationary panel part 56.

According to the constitution (h), by changing a position of the under movable panel part 57, the capacity of the cargo bed can be enlarged or the screen SE in the expanded state can be configured.

The present invention is not limited to the configurations of the embodiments described above and includes various modifications contemplated in the scope without departing from the contents described in the scope of the claims.

What is claimed is:

1. A pick-up style utility vehicle with an expandable cargo bed, the pick-up style utility vehicle comprising a chassis supporting a front seat, a rear seat, a screen formation, and a bottom plate of the cargo bed,
    wherein the pick-up style utility vehicle is capable of changing between a normal state in which the rear seat is situated on the bottom plate and an expanded state in which the cargo bed is expanded into a free space formed by shunting the rear seat from a top of the bottom plate,
    wherein the screen formation is positioned between the cargo bed and the rear seat in the normal state, and comprises two screen formation divisions arranged as a double door, and each of the screen formation divisions is supported rotatably about a vertical shaft by the chassis,
    wherein in the normal state, the two screen formation divisions close a front of the cargo bed and form a screen, and the screen separates the rear seat and the cargo bed,
    wherein in the expanded state, the two screen formation divisions form expanded side plates of the cargo bed,
    wherein the rear seat comprises: a main seat which is rotatable around a first horizontal shaft extending in a right and left direction relative to the chassis; and a backrest which is rotatable around a second horizontal shaft relative to the main seat,
    wherein the rear seat in the expanded state is positioned forward of the rear seat in the normal state,
    wherein each of the screen formation divisions comprises:
    a first screen formation section supported on an outside of the chassis in a right and left direction, the first screen formation section being rotatably supported about the vertical shaft in the normal state; and
    a second screen formation section supported at an inside of the chassis in the right and left direction in the normal state, the second screen formation section being rotatably supported around a vertical shaft by the first screen formation section in the normal state,
    wherein in the expanded state, the two first screen formation sections configure the expanded side plates, and the two second screen formation sections configure the screen.

2. A pick-up style utility vehicle according to claim 1, further comprising a cover roll which can roll out a cover along a vertical direction between the front seat and the rear seat,
    wherein the second screen formation section is arranged at an under portion of the screen formation division,
    wherein in the normal state, the cover is rolled up,
    wherein in the expanded state, the two second screen formation sections which close the front of the cargo bed, configure an under portion of the screen in the expanded state, and the cover which is rolled out configures an upper portion of the screen in the expanded state.

3. A pick-up style utility vehicle according to claim 1,
    wherein the second screen formation section is arranged at an upper portion of the screen formation division,
    wherein in the expanded state, the rear seat configures an under portion of the screen in the expanded state, and the two second screen formation configure an upper portion of the screen in the expanded state.

4. A pick-up style utility vehicle with an expandable cargo bed, the pick-up style utility vehicle comprising a chassis supporting a front seat, a rear seat, a screen formation, and a bottom plate of the cargo bed,
    wherein the pick-up style utility vehicle is capable of changing between a normal state in which the rear seat is situated on the bottom plate and an expanded state in which the cargo bed is expanded into a free space formed by shunting the rear seat from a top of the bottom plate,
    wherein the screen formation is positioned between the cargo bed and the rear seat in the normal state, and comprises two screen formation divisions arranged as a double door, and each of the screen formation divisions is supported rotatably about a vertical shaft by the chassis,
    wherein in the normal state, the two screen formation divisions close a front of the cargo bed and form a screen, and the screen in the normal state separates the rear seat and the cargo bed, wherein in the expanded state, the two screen formation divisions form expanded side plates of the cargo bed, wherein the rear seat comprises: a main seat which is rotatable around a first horizontal shaft extending in a right and left direction relative to the chassis; and a backrest which is rotatable around a second horizontal shaft relative to the main seat, wherein the rear seat in the expanded state is positioned forward of the rear seat in the normal state, wherein the screen formation further comprises a third screen formation division, the third screen formation division being arranged at an upper portion of the screen formation and being supported removably by the two screen formation divisions, wherein the pick-up style utility vehicle further comprising a supporting part to support the third screen formation division on the chassis, wherein in the expanded state, the rear seat configures an under portion of the screen, and the third screen formation division configures the upper portion of the screen in the expanded state by fitting the third screen formation division in the supporting part.

5. A pick-up style utility vehicle with an expandable cargo bed, the pick-up style utility vehicle comprising a chassis supporting a front seat, a rear seat, a screen formation, and a bottom plate of the cargo bed, wherein the pick-up style utility vehicle is capable of changing between a normal state in which the rear seat is situated on the bottom plate and an expanded state in which the cargo bed is expanded into a free space formed by shunting the rear seat from a top of the bottom plate, wherein the screen formation is positioned between the cargo bed and the rear seat in the normal state, and comprises two screen formation divisions arranged as a double door, and each of the screen formation divisions is supported rotatably about a vertical shaft by the chassis, wherein in the normal state, the two screen formation divisions close a front of the cargo bed, and the two screen formation divisions separate the rear seat and the cargo bed, wherein in the expanded state, the two screen formation divisions form expanded side plates of the cargo bed, wherein the rear seat comprises: a main seat which is rotatable around a first horizontal shaft extending in a right and left direction relative to the chassis; and a backrest which is rotatable around a second horizontal shaft relative to the main seat, wherein the rear seat in the expanded state is positioned forward of the rear seat in the normal state, wherein the screen formation further comprises a third screen formation division which is arranged at an upper portion of the screen formation, wherein the third screen formation division comprises a screen formation supporting frame which is fixed on the chassis, and a screen panel which is supported by the screen formation supporting frame, wherein the screen formation supporting frame rotatably supports the two screen formation divisions.

6. A pick-up style utility vehicle according to claim 5, wherein the panel for the screen is removably supported by the screen formation supporting frame, wherein the pick-up style utility vehicle further comprising a supporting part to support the panel for the screen on the chassis between the front seat and the rear seat, wherein in the expanded state, the rear seat configures an under portion of the screen, and the panel for the screen configures an upper portion of the screen by fitting the panel for the screen in the supporting part.

7. A pick-up style utility vehicle according to claim 5, wherein the panel for the screen comprises:

an upper stationary panel part which is fixed on the screen formation supporting frame; and an under movable panel part which is supported slidably along the vertical direction relative to the screen formation supporting frame, wherein in the expanded state, the rear seat configures the under portion of the screen in the expanded state, and the upper stationary panel part configures an upper portion of the screen in the expanded state.

\* \* \* \* \*